(12) United States Patent
Cook et al.

(10) Patent No.: US 8,738,565 B2
(45) Date of Patent: May 27, 2014

(54) COLLECTING DATA FROM DATA SOURCES

(75) Inventors: Jonathan Michael Cook, Austin, TX (US); Randy Allan Rendahl, Raleigh, NC (US); David G. Robinson, Cary, NC (US); Shaw-Ben Shi, Austin, TX (US); Byron Eugene Todd, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2077 days.

(21) Appl. No.: 11/268,978

(22) Filed: Nov. 7, 2005

(65) Prior Publication Data

US 2007/0112889 A1     May 17, 2007

(51) Int. Cl.
*G06F 7/00*     (2006.01)
*G06F 17/30*     (2006.01)

(52) U.S. Cl.
USPC .......................................... 707/602; 707/736

(58) Field of Classification Search
USPC .................. 707/204, 200, 600, 602, 661, 736
See application file for complete search history.

(56) References Cited

U.S. PATENT DOCUMENTS

| | | | |
|---|---|---|---|
| 5,067,107 A * | 11/1991 | Wade ............................... | 703/21 |
| 5,560,005 A | 9/1996 | Hoover et al. | |
| 5,848,405 A | 12/1998 | Norcott | |
| 5,944,778 A | 8/1999 | Takeuchi et al. | |
| 6,021,415 A * | 2/2000 | Cannon et al. ................. | 707/206 |
| 6,289,359 B1 | 9/2001 | Ando et al. | |
| 6,327,574 B1 * | 12/2001 | Kramer et al. .................. | 705/14 |
| 6,356,859 B1 | 3/2002 | Talbot et al. | |
| 6,405,251 B1 | 6/2002 | Bullard et al. | |
| 6,438,472 B1 | 8/2002 | Tano et al. | |
| 6,496,828 B1 | 12/2002 | Cochrane et al. | |
| 6,691,116 B1 * | 2/2004 | Bart ............................... | 707/10 |
| 6,775,682 B1 | 8/2004 | Ballamkonda et al. | |
| 7,272,613 B2 * | 9/2007 | Sim et al. ....................... | 707/102 |
| 8,112,399 B2 | 2/2012 | Buros et al. | |
| 2002/0052898 A1 | 5/2002 | Schilit et al. | |
| 2002/0054587 A1 * | 5/2002 | Baker et al. .................... | 370/352 |
| 2002/0173857 A1 * | 11/2002 | Pabari et al. ...................... | 700/1 |
| 2003/0061132 A1 | 3/2003 | Yu et al. | |
| 2004/0088374 A1 | 5/2004 | Webb et al. | |
| 2004/0193512 A1 * | 9/2004 | Gobin et al. .................... | 705/29 |
| 2004/0243256 A1 * | 12/2004 | Willis et al. ..................... | 700/21 |
| 2005/0033779 A1 | 2/2005 | Seki et al. | |
| 2006/0161894 A1 * | 7/2006 | Oustiougov et al. ........... | 717/121 |
| 2006/0203813 A1 * | 9/2006 | Wu ................................. | 370/363 |
| 2007/0043464 A1 * | 2/2007 | Zeif .............................. | 700/108 |
| 2007/0106711 A1 | 5/2007 | Buros et al. | |
| 2007/0112876 A1 | 5/2007 | Blaisdell et al. | |
| 2007/0112889 A1 | 5/2007 | Cook et al. | |

OTHER PUBLICATIONS

U.S. Appl. No. 11/268,931, filed Nov. 7, 2005, Buros et al.
U.S. Appl. No. 11/268,799, filed Nov. 7, 2005, Buros et al.

(Continued)

*Primary Examiner* — Md. I Uddin
(74) *Attorney, Agent, or Firm* — Yee & Associates, P.C.; Jeffrey S. LaBaw

(57) ABSTRACT

A computer implemented method, apparatus, and computer usable program code for collecting data. The data is collected from a particular data source by an application portion of agent to form collected data. The application portion is associated with the particular data source in response to an event. The collected data stored in a temporary data store for transfer to a data storage system to form stored data. The stored data sent to the data storage system using a generic portion of the agent, wherein the generic portion of the agent is configured to send data to the data storage system.

7 Claims, 17 Drawing Sheets

(56) References Cited

OTHER PUBLICATIONS

Office Action dated Oct. 30, 2007, regarding USPTO U.S. Appl. No. 11/268,931, 22 pages.
Final Office Action dated May 27, 2008, regarding U.S. Appl. No. 11/268,931, 32 pages.
Examiners Answer dated Jan. 6, 2009, regarding U.S. Appl. No. 11/268,931, 33 pages.
Notice of Allowance dated Sep. 2, 2011, regarding U.S. Appl. No. 11/268,931, 19 pages.
Office Action dated Oct. 17, 2007, regarding U.S. Appl. No. 11/268,799, 16 pages.
Final Office Action dated Mar. 13, 2008, regarding U.S. Appl. No. 11/268,799, 19 pages.
Office Action dated Jul. 23, 2008, regarding U.S. Appl. No. 11/268,799, 23 pages.
Final Office Action dated Nov. 21, 2008, regarding U.S. Appl. No. 11/268,799, 22 pages.
Examiner's Answer dated Jul. 21, 2009, regarding U.S. Appl. No. 11/268,799, 21 pages.

\* cited by examiner

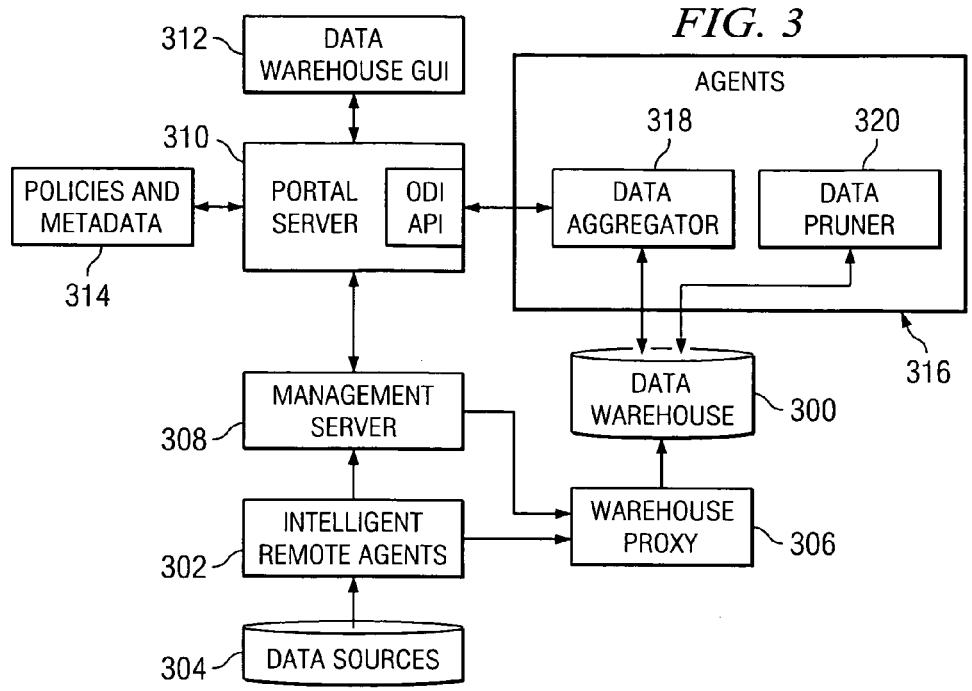
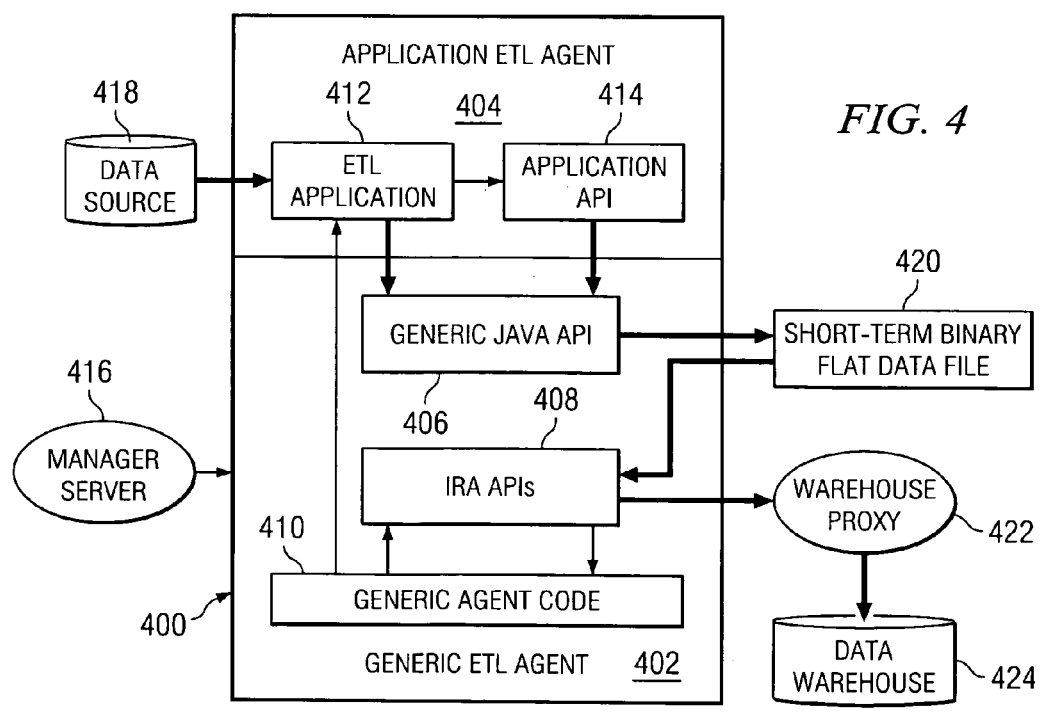

FIG. 6

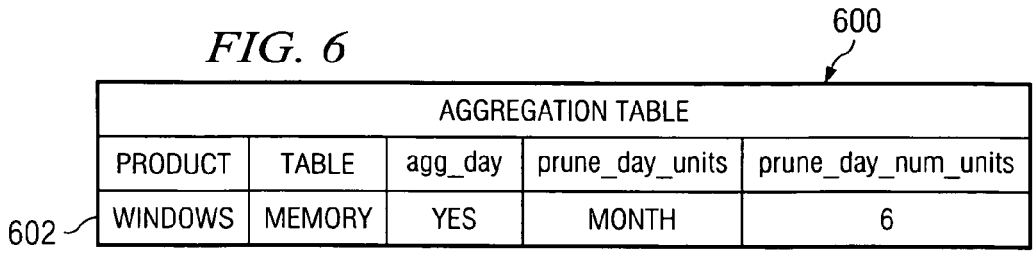

| AGGREGATION TABLE | | | | |
|---|---|---|---|---|
| PRODUCT | TABLE | agg_day | prune_day_units | prune_day_num_units |
| WINDOWS | MEMORY | YES | MONTH | 6 |

602 points to the WINDOWS row; 600 labels the table.

FIG. 7

```
<?xml version="1.0"?>
<!DOCTYPE etlelements SYSTEM "./tdw_etl.dtd">
<etlelements>
<product code="KWM" name="Tivoli Manager for Transaction Processing" majorVersion="1" minorVersion="1" releaseVersion="0" fixVersion="0" dataProvider="KWM"/>
<trace value="Y" />
<source name="TMTPBD" schema="DB2ADMIN" user="xxxx" password="xxxxx" />
<dataTables>
<dataTable code="TRANSACT" name="Transaction">
<dataColumns>
<dataColumn code="ORIGINNODE" name="ORIGINNODE" dataType="char" dataLength="64">
</dataColumn>
<dataColumn code="HOST" name="HOSTNAME" dataType="char" dataLength="32">
</dataColumn>
<dataColumn code="USER" name="USERNAME" dataType="char" dataLength="32">
</dataColumn>
<dataColumn code="APPL" name="APPLICATION" dataType="char" dataLength="64">
</dataColumn>
<dataColumn code="TX" name="TRANSACTION" dataType="char" dataLength="64">
</dataColumn>
<dataColumn code="TXTIME" name="TXTIMESTAMP" dataType="timestamp" dataLength="16">
</dataColumn>
<dataColumn code="RTTTIME" name="ROUNDTRIPTIME" dataType="int" dataLength="4">
</dataColumn>
<dataColumn code="RESPTIME" name="RESPONSETIME" dataType="int" dataLength="4">
</dataColumn>
<dataColumn code="IP" name="IPADDRESS" dataType="char" dataLength="32">
</dataColumn>
</dataColumns>
</dataTable>
</dataTables>
</etlelements>
```

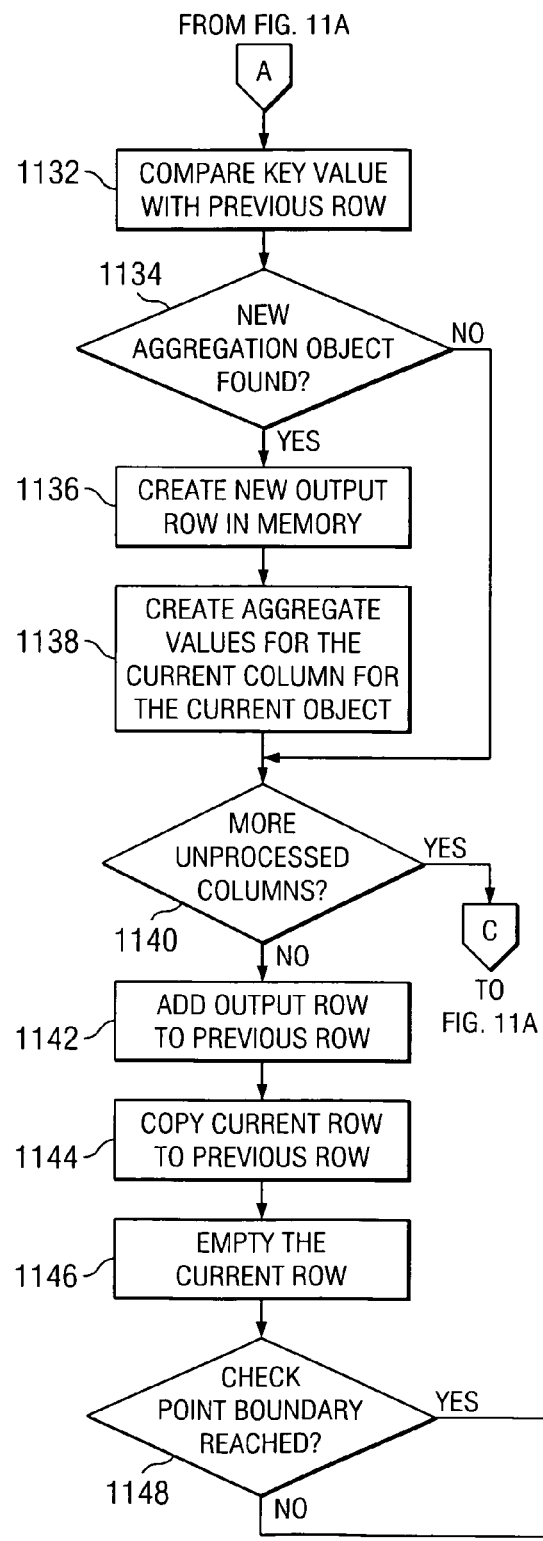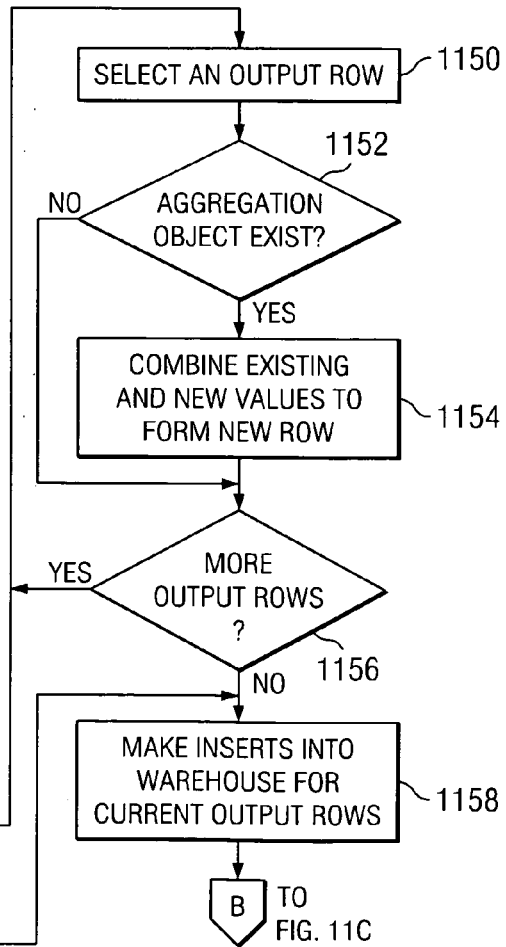
FIG. 11B

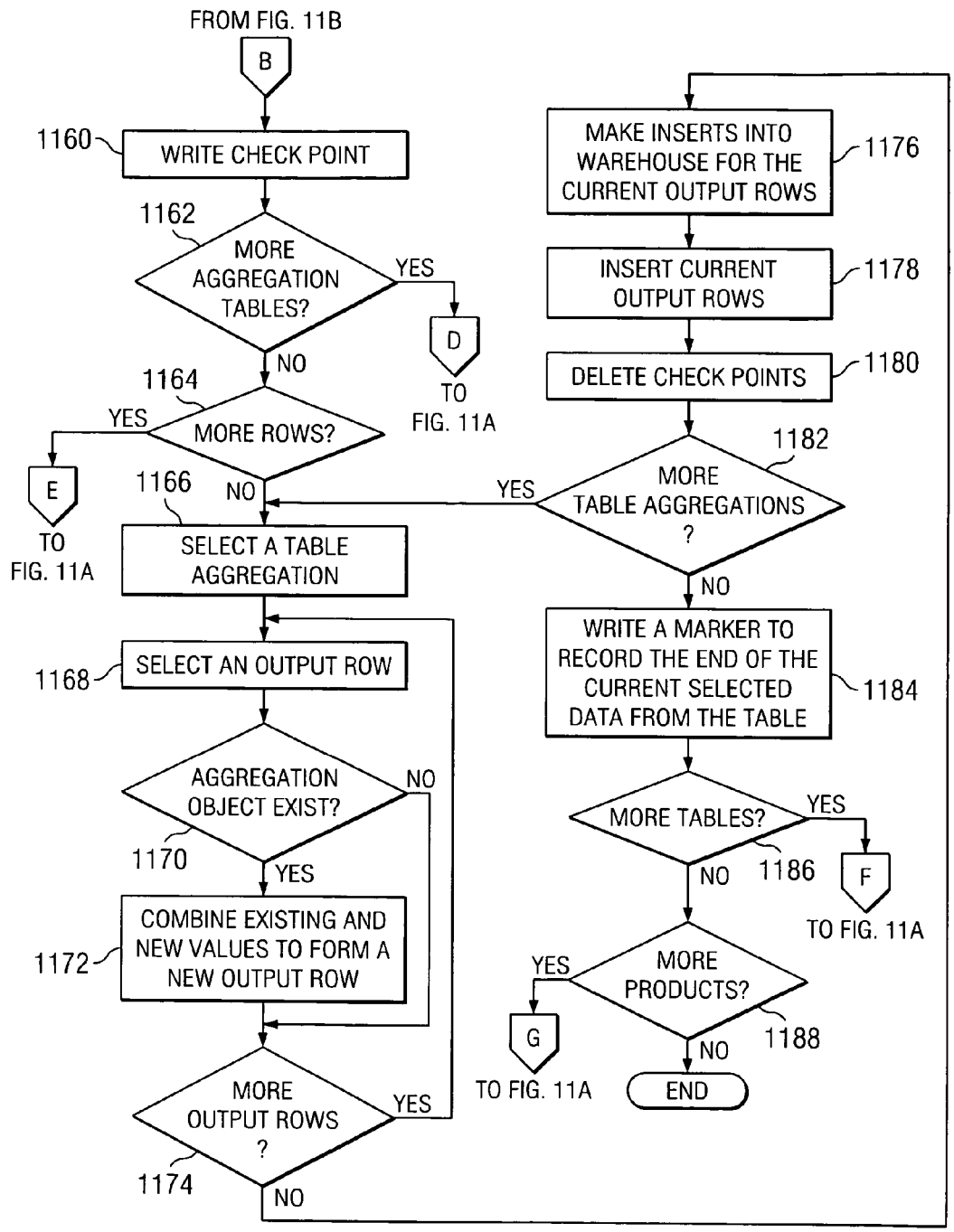

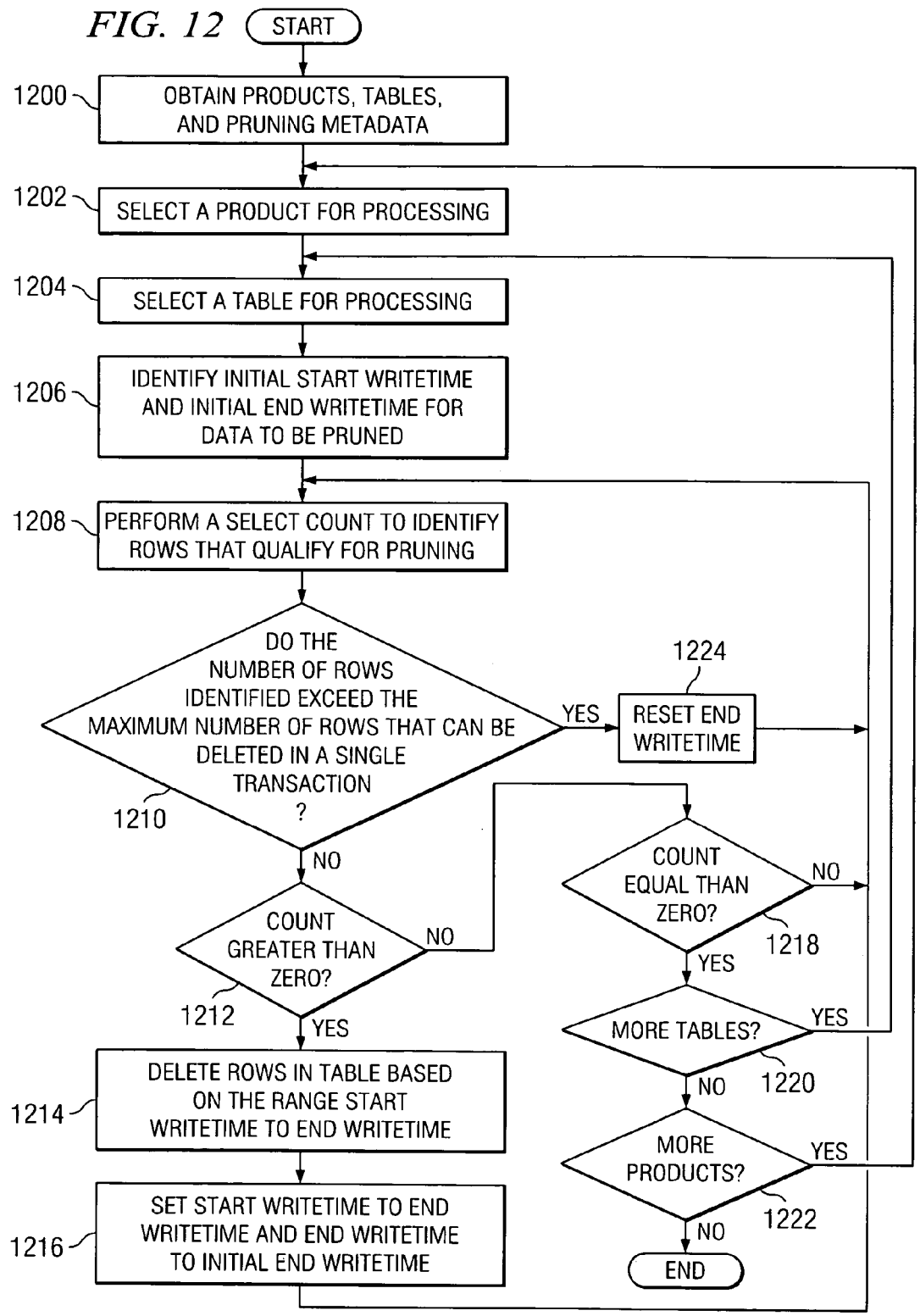

COLLECTING DATA FROM DATA SOURCES

BACKGROUND OF THE INVENTION

1. Field of the Invention

The present invention relates generally to an improved data processing system and in particular to a computer implemented method and apparatus for managing data. Still more particularly, the present invention relates to a computer implemented method, apparatus, and computer usable program code for aggregating data.

2. Description of the Related Art

A data warehouse is a storage system that is typically used to store data outside of the operational system in which the data is typically used or generated. In warehousing data, data was previously placed onto tapes when the data became inactive. Currently, a data warehouse is used to store data over different periods of time, allowing a user to generate queries to access the data. Also, by combining data from multiple sources, an ability to cross reference the data from the different sources also is possible. Additionally, with a data warehouse system, a platform is present to merge data from multiple current applications as well as integrate multiple versions of the same application.

For example, an organization may migrate to a new business application that replaces an old main frame-based legacy application. The data warehouse may serve as a platform to combine the data from the old and new applications. One example of a use of a data warehouse is putting together patient data from different locations for a medical system having multiple locations and multiple specialties. By collecting data from the different locations and placing the data into a data warehouse, patterns and insights into different facets such as patient billing and treatment data may be obtained.

Many different products are present for providing data warehouse functions. For example, DB2 Warehouse Manager is a product from International Business Machines Corporation that provides an ability to build, manage, and access data warehouses.

One current problem with these systems is that data is typically collected in a fine granular format from the different sources. For example, data may be collected in terms of minutes or seconds. As a result, large amounts of data are stored within the data warehouse. Issues arise as to how to maintain and keep all of this data. These issues become greater as large amounts of data are accumulated over a long period of time, such as months or years. Data accumulated for months may result in too much data being present to allow all of the data to be accessed online. As a result, in many cases, older data must be moved to a secondary type of storage, such as a tape or optical disk. Another issue present with currently available data warehouse systems is the actual collection of data from the different sources.

Therefore, it would be advantageous to have an improved computer implemented method, apparatus, and computer usable program code for implementing a data warehouse system.

SUMMARY OF THE INVENTION

The present invention provides a computer implemented method, apparatus, and computer usable program code for collecting data. The data is collected from a particular data source by an application portion of agent to form collected data. The application portion is associated with the particular data source in response to an event. The collected data stored in a temporary data store for transfer to a data storage system to form stored data. The stored data sent to the data storage system using a generic portion of the agent, wherein the generic portion of the agent is configured to send data to the data storage system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used in a data warehouse system in accordance with an illustrative embodiment of the present invention;

FIG. 4 is a diagram illustrating an intelligent remote agent in accordance with an illustrative embodiment of the present invention;

FIG. 6 is an aggregation table in accordance with an illustrative embodiment of the present invention;

FIG. 7 is a diagram illustrating meta data information used by an intelligent remote agent to collect data from a data source in accordance with an illustrative embodiment of the present invention;

FIGS. 11A-11C is a flowchart of a process for aggregating data in accordance with an illustrative embodiment of the present invention;

FIG. 12 is a flowchart of a process for pruning data in a date warehouse in accordance with an illustrative embodiment of the present invention;

DETAILED DESCRIPTION OF THE PREFERRED EMBODIMENT

Figure 1:
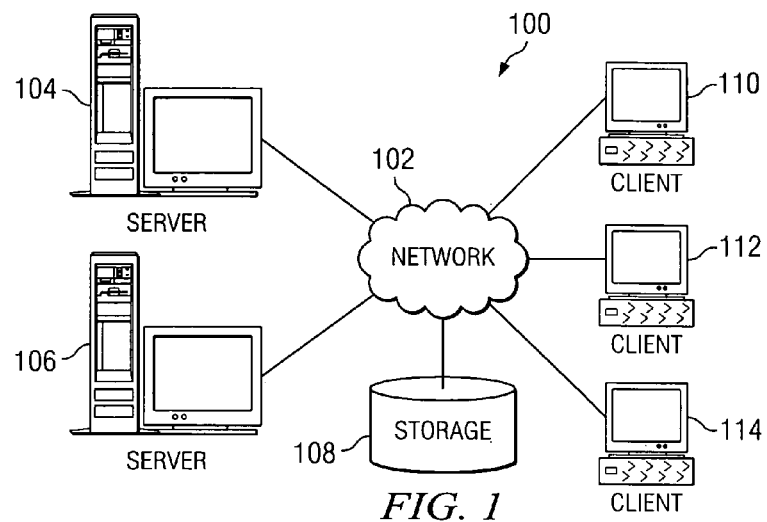
FIG. 1 is a pictorial representation of a network of data processing systems in which aspects of the present invention may be implemented.
Figure 2:
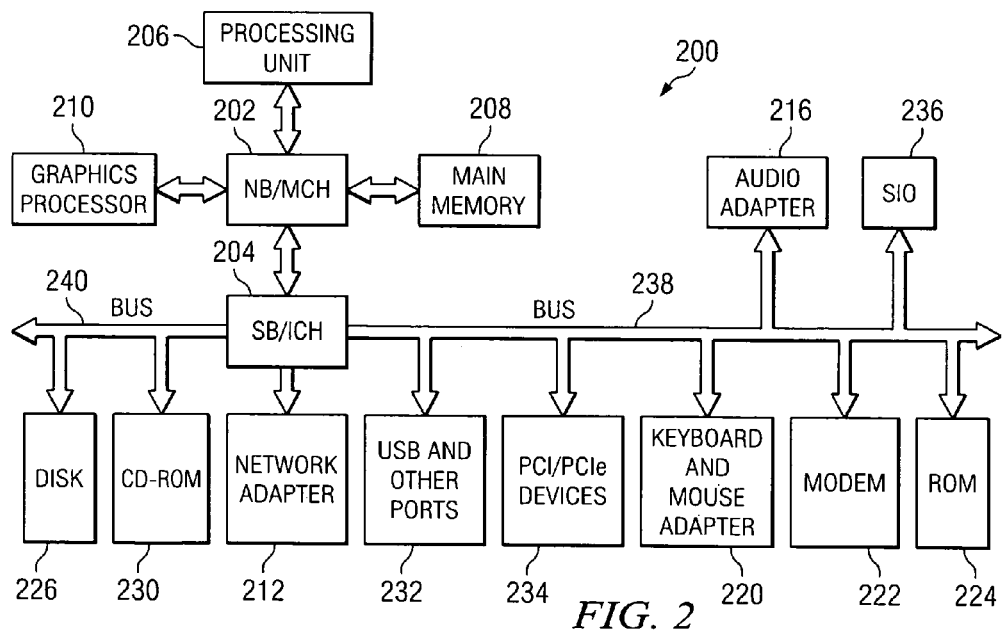
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictoral representation of a network of data processing systems in which the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage system 108. In this illustrative example, storage system 108 may be a data warehouse. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for managing data in a storage system. In particular, the aspects of the present invention may be applied to a data warehouse. A policy is identified for managing data in the data storage system. Raw data in the storage system is located. This located data is aggregated based on the policy with the aggregated data being stored in the data storage system. This data storage system may take other forms, such as a database or other types of data store in data. These other types of data may be, for example, files, databases, tables, or other types of data or data structures that may be stored. The policy used to aggregate data is configurable by users.

The raw data in these illustrative examples is the data to be aggregated. For example, the raw data may be data collected from different data sources, such as databases. A set of records from a data source may be aggregated to form a single record or combined set of records that take up less space within the data storage system. In other words, the aggregation that occurs in the different illustrative examples is a summarization or combining of data from two or more records into a single record. This process of aggregation is repeated to generate a set of records that are smaller than the original record. The raw data also may be, for example, other aggregated data that is further aggregated. For example, raw data may be collected on a per-second interval. This data may be aggregated into records in which each record contains an average or summary of the data over an hour. The records generated for the hourly basis may become raw data for further aggregation into records that contain information on a daily or weekly basis.

The aspects of the present invention also provide a mechanism for pruning aggregated and raw data. This pruning is removal of data. This removal of data is based on the policies set for the particular data storage system. In addition, the aspects of the present invention provide an ability to gather data and send that data from data sources in an automated fashion. The different aspects of the present invention provide an agent that is configurable to gather data from a particular data storage and return that data to the data storage system. The illustrative examples implement these different aspects of the present invention within a data warehouse. These aspects of the present invention may be applicable to any sort of data storage system in which the management and/or collection of data is desirable.

With the ability to collect, store, and distribute information, the aspects of the present invention provide an ability to store atomic data at the highest granularity level to satisfy any potential demand for information.

Turning now to FIG. 3, a diagram illustrating components used in a data warehouse system is depicted in accordance with an illustrative embodiment of the present invention. In this illustrative example, data warehouse 300 provides a repository for historical management data as well as being a data source for different reporting applications. Data, such as performance and availability data stored within data warehouse 300 may come from various data sources.

In this illustrative example, intelligent remote agents 302 monitors data sources 304 to collect data for transmission to data warehouse 300. Data sources 304 may take various forms, such as, for example, data processing systems, applications, Web sites, or other databases. The collected data is initially stored locally by intelligent remote agents 302. These agents store the data locally on a data processing system on which the intelligent remote agents execute. The collected data is sent to data warehouse 300 through warehouse proxy 306. This collected data may be sent to warehouse proxy 306 based on the event. This event may be a periodic event, such as the expiration of a timer or the passing of some interval of time.

Additionally, the event also may be non-periodic. For example, the event triggering the transmission of data to warehouse proxy 306 may be initiated through detecting a certain type of request being sent to the database. Warehouse proxy 306 is implemented using a data processing system, such as data processing system 200 in FIG. 2 in these examples.

Intelligent remote agents 302 also may pass commands from a user to the target system or subsystem within data sources 304. These agents interact with a single data processing system or application in these examples. Depending on the implementation, an agent may interact with more than one application or data processing system. In most cases, an intelligent remote agent in intelligent remote agents 302 is located on the same data processing system as the data source that the intelligent remote agent is monitoring.

Management server 308 serves as a focal point to manage intelligent remote agents 302. Management server 308 may be implemented using a server, such as server 106 in FIG. 1. Management server 308 may receive data from intelligent remote agents 302 or from other management servers managing other intelligent remote agents, which are not shown in these examples. Depending on the number of intelligent remote agents that are installed and the amount of data collected by intelligent remote agents 302, a single management server or a hierarchy of management servers, such as management server 308, may report to a central management server.

Portal server 310 serves as an interface and provides configuration from data warehouse graphical user interface (GUI) 312 to a user. Portal server 310 also may be implemented using a server, such as server 104 in FIG. 1. Through portal server 310, an ability to monitor the availability and performance of systems, such as management server 308 and those within data sources 304 is present.

Data warehouse GUI 312 runs on a client data processing system, such as client 114 in FIG. 1. This client may take the form of a Java® based application. The client may be installed on a data processing system and run as a desktop application. Alternatively, the client may run through a browser in which the client application is downloaded to the browser for execution.

Warehouse proxy 306 forms a conduit for data collected by intelligent remote agents 302 to be stored within data warehouse 300. In these examples, warehouse proxy 306 is implemented using a multi-threaded server process. This type of process is able to handle concurrent requests from multiple agents in intelligent remote agents 302. In these examples, each agent in intelligent remote agents 302 sends a batch of 1000 records to warehouse proxy 306 for processing.

A user may configure and set the collection of data by intelligent remote agents 302 using policies and meta data 314. This configuration of remote intelligent agents 302 using policies and meta data 314 occurs through data warehouse GUI 312. Policies and meta data 314 contain the information used to trigger an agent within intelligent remote agents 302 to collect data. Further, this information also is used to tell the agent what information to collect and tell the agent from which source in data sources 304 data is to be collected.

A policy may be specified at the attribute group. An attribute group contains a number of different attributes. An attribute is a characteristic of a managed object or node. For example, disk name is an attribute for a disk, which is a managed object. Attributes may be used to build situations to monitor the performance of a managed system. When the values of selected attributes in a situation exceed the threshold settings, the managed system may post an alert. An attribute group contains a set of attributes. For example, an attribute group may be a disk group, a file information group, a network group, or a process group. Each of these groups may contain a table in which table names are used for the collection of data.

Data within data warehouse 300 is managed using agents 316. Agents 316 includes data aggregator 318 and data pruner 320. Data aggregator 318 and data pruner 320 provide a mechanism to administer and manage information within data warehouse 300. In these examples, the data collected by intelligent remote agents 302 take the form of rows or records from tables from data sources 304. This data is placed in data warehouse 300 in a similar form for aggregation for aggregation and pruning by agents 316. In other words, data aggregator 318 performs its operations on a set of rows in a table returned by agents 316. This table includes identification information on the source, such as a product name or host name. In these examples, the aggregation occurs by combining data to create a summary of the aggregated data. Aggregation is not intended to mean the collection of data from different course and its placement into data warehouse 300. In particular, data aggregator 318 is employed to aggregate data in a manner that reduces the amount of disk space. In these examples, the aggregation takes the form of summarizing data. Further, data pruner 320 removes data that is no longer needed to further aid in reducing disk space used in data warehouse 300. This removal of data from data warehouse 300 may take the form of deleting records in the data warehouse. Alternatively, the removal of data from data warehouse 300 may be accomplished by transferring records in data warehouse 300 onto tapes or some other more permanent and cheaper storage media.

Data aggregator 318 provides an ability to aggregate data within data warehouse 300. With data aggregator 318, the performance of queries can be improved dramatically. Aggregation of data involves combining or putting together data based on different attributes or policies. For example, data may be aggregated by placing all of the data into a single timezone day, such as from midnight to midnight in the selected timezone. Data also could be aggregated on a weakly, monthly, quarterly, or yearly basis.

Turning now to FIG. 4, a diagram illustrating an intelligent remote agent is depicted in accordance with an illustrative embodiment of the present invention. Agent 400 is an example of an intelligent remote agent within intelligent remote agents 302 in FIG. 3.

In this example, agent 400 contains two main components, generic extract, transform, and load (ETL) agent 402 and application extract, transform, and load (ETL) agent 404. Application ETL agent 404 is the application portion agent 400 and is specifically tailored to collect data from a particular data source. Generic agent 402 is the generic portion of agent 400 that is designed to transfer data collected by application ETL agent 404 to a data storage system, such as a data warehouse. In this manner, the creation of agents for a data warehouse may be simplified by adding a specific application agent, such as application ETL agent 404, to a generic agent. Agent 400 also may be used with other data storage systems, such as a database or other types of data stores. The data storage system includes a storage device and any hardware and/or software needed to store data on the storage device in some desired format. The desired format may be, for example, tables or entries for a database.

Agent 400 is an example of an intelligent remote agent in intelligent remote agents 302 in FIG. 3. Generic ETL agent 402 contains generic Java API 406, intelligent remote agent (IRA) API 408, and generic agent code 410. Application ETL agent 404 contains extract, transform, and load (ETL) application 412 and application API 414. These API components form an interface system that is used by generic ETL agent 402 and application ETL agent 404 to communicate with each other. For example, data collected by application ETL agent 404 is passed to generic agent 402 through these interfaces.

Agent 400 performs extract, transform, and load functions. The extract function is used to read data from a source, such as a database. The transform function is employed to convert the extracted data from the source in its previous form to a form needed for the target, such as a data warehouse. The load function is sued to write data to the target.

Generic ETL agent 402 provides a framework by which a specific application agent, such as application ETL agent 404 may be constructed. Both of these components are put together for agent 400 to function in these illustrative examples. Generic ETL agent 402 receives information from management server 416. This information identifies the data source to be monitored. This information may be retrieved by the management server from a source, such as policies and meta data 314 in FIG. 3. Additionally, this information also includes information on the format of the data that is to be expected from a data source, such as data source 418 in this example.

Upon identifying the information for monitoring data source 418, generic agent code 410 calls intelligent remote agent API 408 to register its tables and their associated "take sample" method. In these examples, the data stored in data warehouse 424 are stored in table form. As a result, if the data obtained from data source 418 is not in a table form, agent 400 converts the data into such a format. Of course, the storage of data in data warehouse 424 may take different forms depending on the implementation. Other data structures other than tables may be used if desired.

In these examples, the tables that are registered for an agent are the tables located in data warehouse 424 for which the agent will be collecting information. Each such table may correspond to one or more tables in data source 418. For each data warehouse table for which an agent is collecting data, the agent registers a "take sample" method that will be invoked when the collection interval has expired. When a collection interval has expired for a table, intelligent remote API 408 generates a call to the take sample method that was previously registered. In these examples, the "take sample" method is part of generic agent 410. The take sample method in generic agent code 410 invokes ETL application 412 passing a take sample command. As a result, ETL application 412 reads meta data to determine which source database that the connection is to be made. In these examples, the meta data is provided by management server 416. After the connection is made, ETL application 412 collects data from data source 418 with this information being placed into short-term binary flat data file 420 through a call to generic Java API 406. Generic Java API 406 contains the generic ETL functions. Data is collected during a collection interval. Each time a collection interval occurs, agent 400 collects data from data source 418 and places that data into short-term binary flat data file 420. More specifically, ETL application 412 collects the data from data source 418. This data is stored in short-term binary flat data file 420 through ETL application 412 initiating a call to generic Java API 406 using application API 414. Generic Java API 406 writes the data collected by ETL application 412 into short-term binary flat data file 402. A warehouse interval is an interval after which data is sent to the data warehouse. When a warehouse interval expires, the data contained within short-term binary flat data file 420 is written to warehouse proxy 422 for transfer to data warehouse 424. This data file is sent to warehouse proxy 422 by using the intelligent remote agent API 408. This agent API is an interface to data warehouse 424 and performs a remote procedure call (RPC) to warehouse proxy 422 to transfer the data to data warehouse 424. In these examples, up to 1000 lines of sample data are transferred, from the short-term binary flat file, per invocation.

Agent 400 is provided for purposes of illustrating on manner in which an agent may be implemented in accordance with an illustrative embodiment of the present invention. Depending on the particular implementation, agent 400 may be implemented in other manners. For example, agent 400 may contain only a single component rather than two components as shown in FIG. 4.

Figure 5:
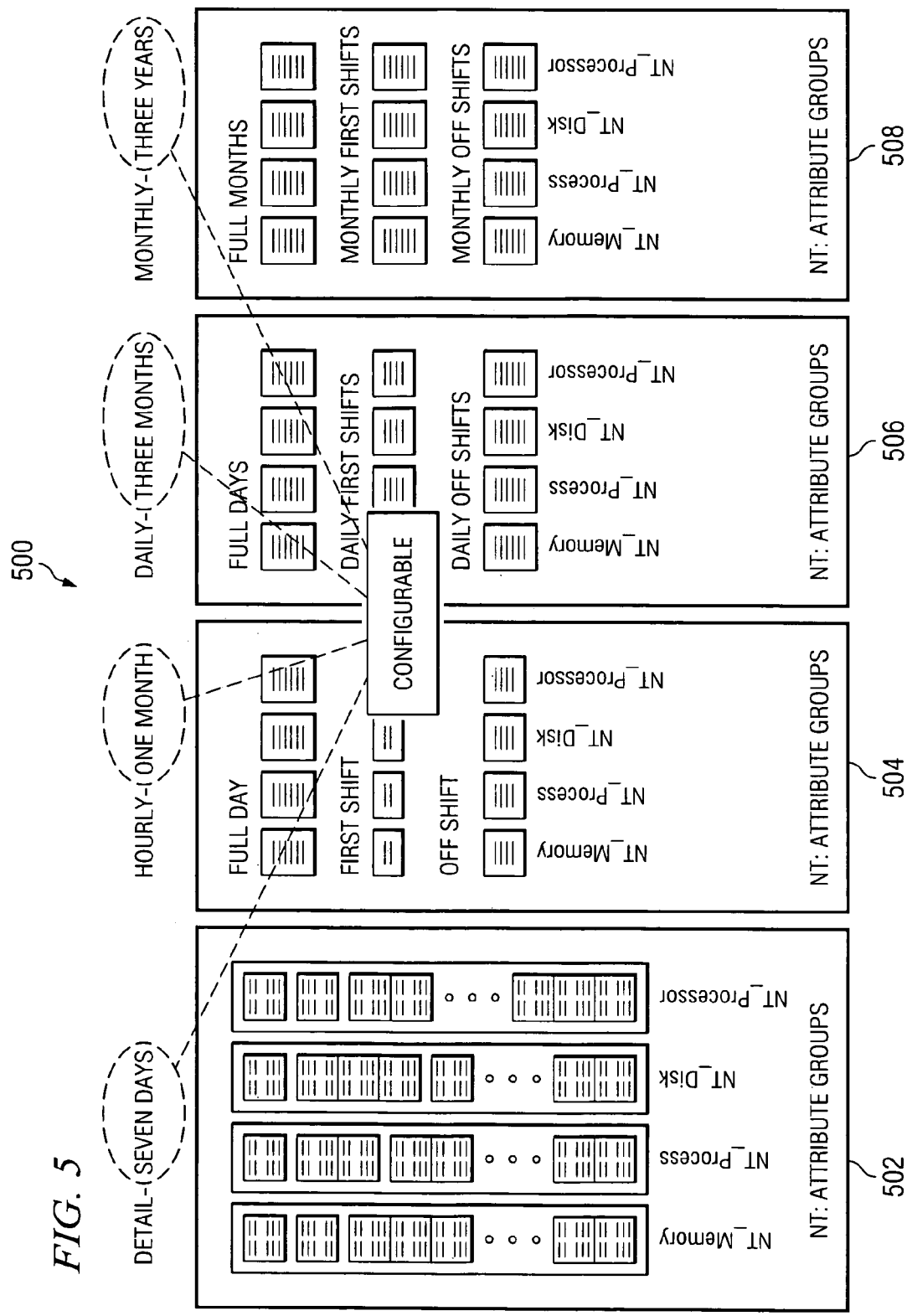
FIG. 5 is a diagram illustrating aggregation and pruning of data in accordance with an illustrative embodiment of the present invention.

With reference now to FIG. 5, a diagram illustrating aggregation and pruning of data is depicted in accordance with an illustrative embodiment of the present invention. Data 500 in FIG. 5 is an example of data in a data warehouse, such as data warehouse 300 in FIG. 3. Section 502 shows data that has been collected by agents and sent to the data warehouse. The data in section 502 is raw unprocessed data in these examples. After the data is collected, the aggregation and pruning of the data in section 502 occurs through policies. These policies may be specified by users. In these examples, the policies are stored in policies and meta data 314 in FIG. 3. An example of a policy is to produce hourly and daily aggregated data for memory-related data for Windows® servers.

In this illustrative example, data 500 may be aggregated into different granularities. The granularities illustrated in this example are found in sections 504, 506, and 508. The data in these sections are generated through the aggregation of raw data in section 502. Data in some of these other sections also may serve as raw data during the aggregation process. For example, data in section 504 may serve as raw data to generate the data in section 506.

Section 504 contains hourly data. Disk data is captured on the hour. Daily data is found in section 506 in which all of the data in the data warehouse is rolled into a single selected timezone day. Section 508 shows monthly data in which all of the data in the section is defined in terms of a calendar month. Data may be aggregated into other granularities, such as on a weekly, quarterly, or yearly basis. In other words, data is aggregated based on a number of values for each row. For example, data for memory-related data is aggregated at the hourly level based on a unique set of values for (year, month, day, hour, hostname) for each row of raw data. More complex examples occur for databases, where the aggregation at the hourly level for database-related raw data is based on a unique set of values for year, month, day, hour, hostname, instance, and database. Although the examples illustrate data being aggregated based on time, data may be aggregated using other measurements. For example, the data may be aggregated by application type, application name, or server name. In these examples, the default parameter that is aggregated is in time. The next level of aggregation using the data aggregated by time may be through other types of parameters or measurements, such as application type.

With aggregating data in a data warehouse, the performance of queries may be improved. Further, the amount of disk space consumed by data also may be reduced significantly. In aggregating the data in section 502, the actual data is summarized into the appropriate time periods in these examples. Additionally, each section also is configurable for pruning to reduce the amount of disk space needed for data within a data warehouse.

For example, the detailed data received from agents is maintained for seven days in section 502. Hourly data is maintained for one month in section 504. The daily data in section 506 is maintained for three months, while the monthly data in section 508 is maintained for three years in these illustrative examples. The maintenance of this data is selectable as configuration information for printing.

Turning now to FIG. 6, an aggregation and pruning table is depicted in accordance with an illustrative embodiment of the present invention. In these examples, aggregation and pruning table 600 contains entries defining the aggregation that is to occur. Aggregation and pruning table 600 holds one row per raw table that is enabled for aggregation and/or pruning. In aggregation and pruning table 600, columns are present that indicate all the levels of aggregation that are enabled. The values in the rows are used to indicate to the aggregation engine which levels of aggregation should be processed for each raw table. As can be seen in aggregation and pruning table 600, entry 602 indicates that the product is a Windows® product and the table is a memory table in which data is aggregated to the day level and data at the daily level is pruned when it is six months old. In this example, the aggregation and pruning metadata at the day level only is shown for clarity. In the real table, similar
columns exist for the various aggregation levels and pruning levels supported. For example, an entry may define that the aggregation is to aggregate data into an hourly or daily basis.

Turning now to FIG. 7, a diagram illustrating meta data information used by an intelligent remote agent to collect data from a data source in accordance with an illustrative embodiment of the present invention. In this example, XML file 700 is an example of a XML file containing meta data about a data feed from a data source. XML file 700 contains meta data used and an intelligent remote agent, such as intelligent remote agent 400 in FIG. 4, to collect data from a data source. This meta data may be found at a portal server, such as portal server 310 within policies and meta data 314 in FIG. 3.

In this illustrative example, line 702 provides a name of a data source. In this example, the name is for a particular product. Line 704 provides information needed to access the product. In this particular example, the information includes a user name and password. Section 706 in XML file 700 shows the information on the data that is to be collected from the data source. In particular, these lines in section 706 describe the columns (short name, long name, datatype, datalength) for each table to be processed in the data source.

Figure 8A:
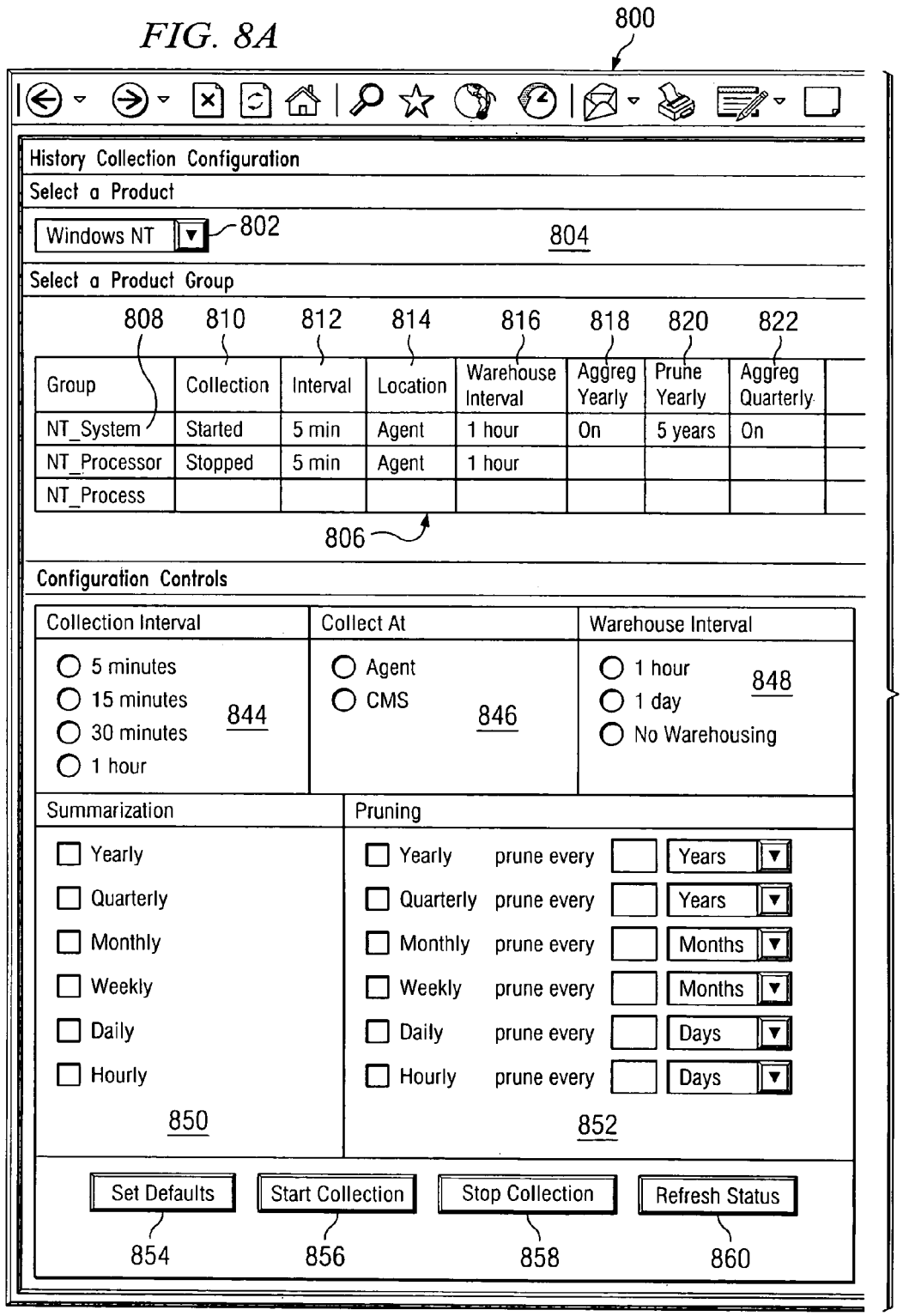
FIGS. 8A-8B are diagrams illustrating a graphical user interface used to control collection, aggregation, and printing of data for a data warehouse in accordance with an illustrative embodiment of the present invention.
Figure 8B:
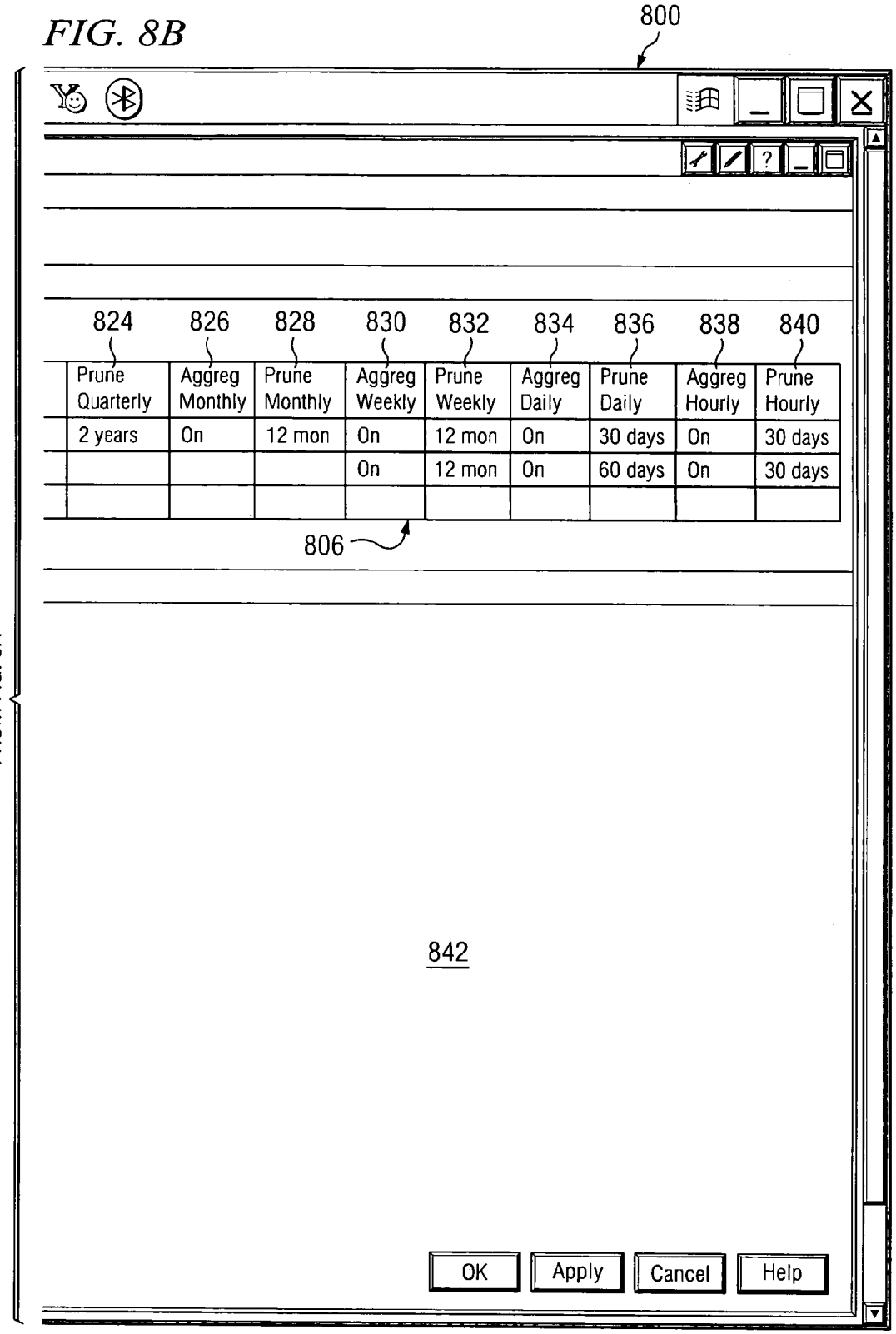

Turning now to FIGS. 8A-8B, diagrams illustrating a graphical user interface used to control collection, aggregation, and printing of data for a data warehouse is depicted in accordance with an illustrative embodiment of the present invention. In this example, window 800 is an example of a graphical user interface that is presented to define aggregation, printing, and collection of data for a data warehouse, such as data warehouse 300 in FIG. 3. This graphical user interface may be presented through a portal server, such as portal server 310 using data warehouse GUI 312 in FIG. 3. In this example, a product is selected in field 802. When a product is selected, a product group is presented within section 804. For example, entry 806 contains group field 808, collection field 810, interval field 812, location field 814, warehouse interval field 816, aggregation yearly field 818, prune yearly field 820, aggregation quarterly field 822, prune quarterly field 824, aggregation monthly field 826, prune monthly field 828, aggregation weekly field 830, prune weekly field 832, aggregation daily field 834, prune daily field 836, aggregation hourly field 838, and prune hourly field 840.

As can be seen for entry 806, group field 808 is NT_System. Collection field 810 indicates that collection has started. An interval of five minutes is the interval for collection as identified in interval field 812. The location of the collection in location field 814 is an agent. The warehouse interval is identified in warehouse interval field 816 as one hour. In other words, data is collected locally every five minutes by an agent with the collected data being sent to the data warehouse every hour.

In this illustrative example, entry 806 indicates that aggregation occurs yearly with the data being pruned every five years for the yearly aggregation as shown in aggregation yearly field 818 and prune yearly field 820. Aggregation quarterly field 822 and prune quarterly field 824 illustrates that quarterly pruning with data being pruned when the data is greater than two years. Monthly aggregation occurs with data being pruned when data is greater than twelve months as shown in aggregation monthly field 826 and prune monthly field 828. Aggregation weekly field 830 and prune weekly field 832 shows that weekly aggregation occurs with data being pruned from this type of aggregation when the data is greater than twelve months old.

Daily aggregation also occurs with pruning of data that is greater than thirty days old as shown in aggregation daily field 834 and prune daily field 836. Hourly aggregation occurs with these types of records being pruned when the data is greater than thirty days old as shown in aggregation hourly field 838 and prune hourly field 840.

This type of information may be set or changed by selecting entry 806. The change in this information is made through configuration controls section 842. Area 844 within configuration controls section 842 allows a user to select collection intervals. In this example, the collection intervals are five minutes, fifteen minutes, thirty minutes, and one hour. These intervals may differ depending upon the particular example. The location of the collected data is selected in area 846. The data may be collected at an agent or at a management server.

The warehouse interval in which data is sent to a data warehouse is set in section 848. In these examples, nowhere has or may occur in which data is not warehoused or sent to the data warehouse. Alternatively, the data warehouse interval may be one hour or one day after which information is sent to the data warehouse.

The type of aggregation that may be selected is shown in area 850. Data may be aggregated on a yearly, quarterly, monthly, weekly, daily, or hourly basis in these illustrative examples. Pruning is set in area 852 in which pruning may occur on a yearly, quarterly, monthly, weekly, daily, or hourly basis. The particular interval in which the pruning occurs may be set by placing the particular interval within area 852. For example, if yearly pruning is selected, data may be pruned after some number of years as set by the user.

Default information for these types of collection, aggregation, and pruning settings may be selected through selecting control 854. The collection of data may begin after the settings are set through selecting control 856. Collection may be stopped or halted through selecting control 858. The current status of the information may be identified by selecting control 860 in these examples.

Through window 800, a user is able to define how data is collected, aggregated, and pruned for particular products. The illustration of the particular types of aggregation, pruning, and collection in window 800 are presented for purposes of illustrating one manner in which a user may control these settings. The particular settings and intervals shown, as well as the arrangement of these different controls and entries are not meant to imply architectural limitations in the manner in which this information may be set. For example, rather than showing all of the information within a single window, such as window 800, a wizard in which a series of windows are presented to explain and request input for the different settings may be employed depending upon the particular implementation. A user interface employed to select reports and the different reports generated in response to those selections. With these aspects of the present invention, the user has an ability to view real time data and historical data through simple time span selection. This data is the data collect by the different agents and sent to the data warehouse. The agents in many cases may send data on a real-time basis to the data warehouse for aggregation.

Through the different user interfaces illustrated in these figures, the user may select a time span of the data that is to be presented and select whether to see detailed or aggregated data. As can be seen in the examples below in FIGS. 9A-9F, the aggregated data is more useable then the unaggregated or raw data. With these reports, a user can determine whether further analysis is needed. If further analysis is desired, the user may "drill down" or view more detailed data using these user interfaces. In response to these selections thru the user interfaces presented in FIGS. 9A-9F, the aspects of the present invention generate structured query language queries based on the time span and intervals selected.

Figure 9A:
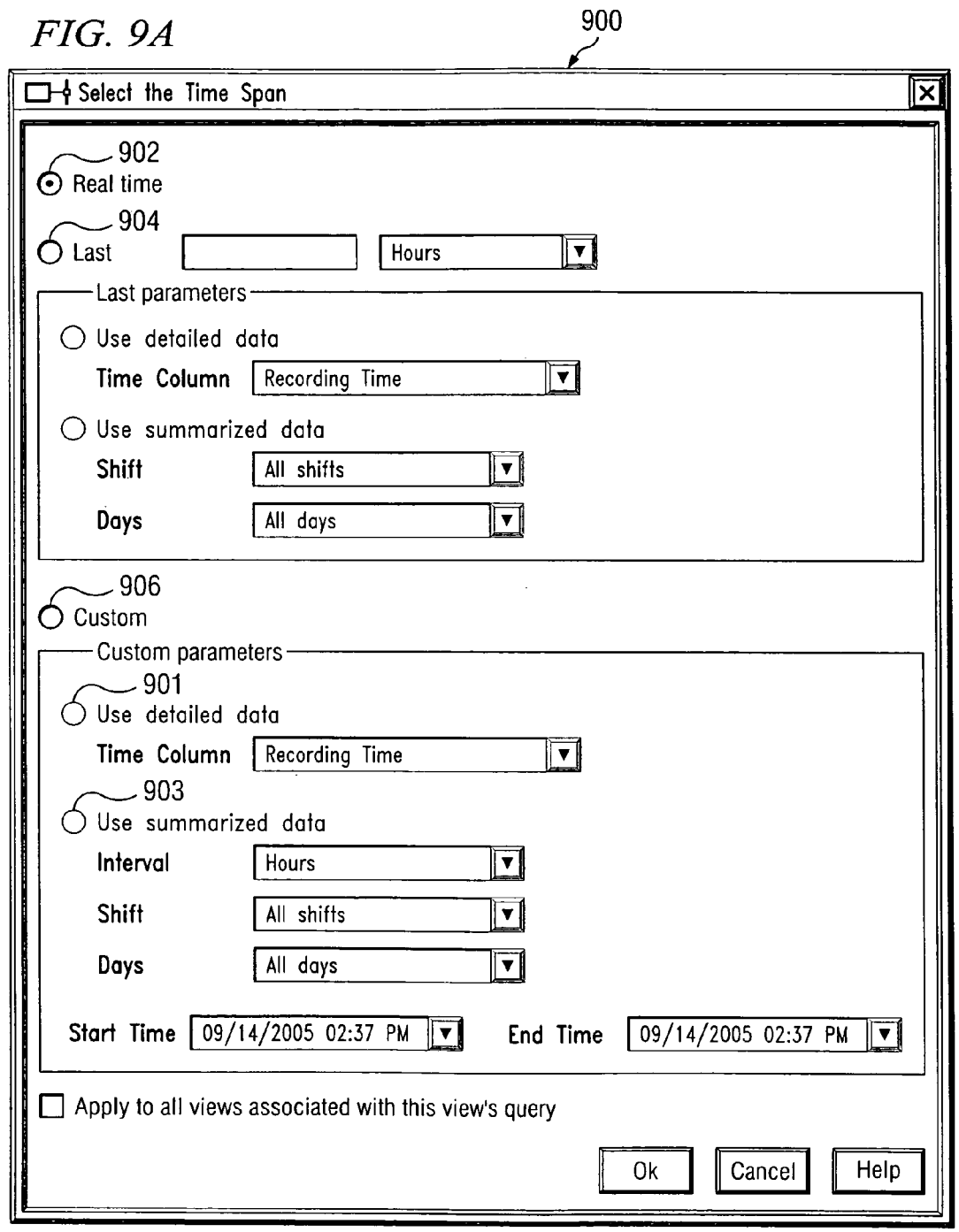
FIGS. 9A-9F are user interfaces for selecting and displaying data from a data warehouse in accordance with an illustrative embodiment of the present invention.
Figure 9B:
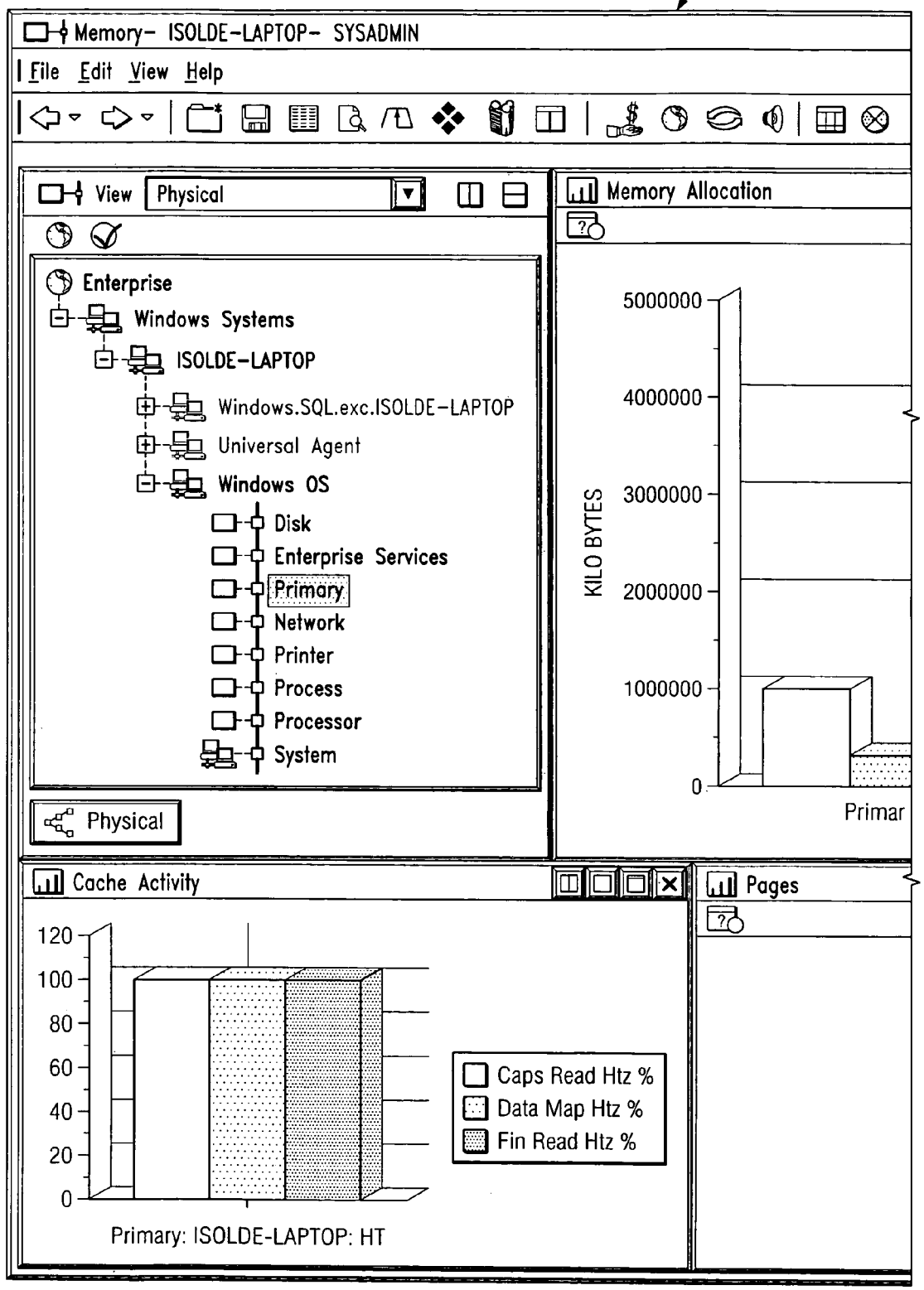

Turning now to FIGS. 9A and 9B, user interfaces for selecting and displaying data from a data warehouse is depicted in accordance with an illustrative embodiment of the present invention. In this example, window 900 in FIG. 9A is an example of a graphical user interface presented to a user to select the manner in which data in a data warehouse is to be presented to a user. User input into window 900 is used to generate a query to retrieve data from a data warehouse for presentation to a user. Window 900 is an example of a window that may be presented through a graphical user interface, such as data warehouse GUI 312 in FIG. 3. In window 900, a user may select the presentation of data through real time field 902, last field 904, or custom field 906. Real time field 902 allows real time data to be selected. Last field 904 allows for historical to be selected. In this particular type of selection a user may specify tables and columns to be included. Additionally, the amount of detail data also may be selected when last field option is selected. Custom field 906 is an option that allows a user to use summarized or detailed tables. Detail tables may be selected by selecting field 901 and summarized data may be selected by selecting field 903.

Window 900 allows a user to select tables and columns to be included in the query in the amount of time to apply to the query when a historical selection of information has been enabled. In this particular example, real time field 902 has been selected resulting in a presentation of window 908 in FIG. 9B. In this example, real time information on the collection of data is presented in window 908. Window 908 shows detailed data without any aggregation for the last seven days in this example. This data is presented when real time field 902 is selected.

Figure 9C:
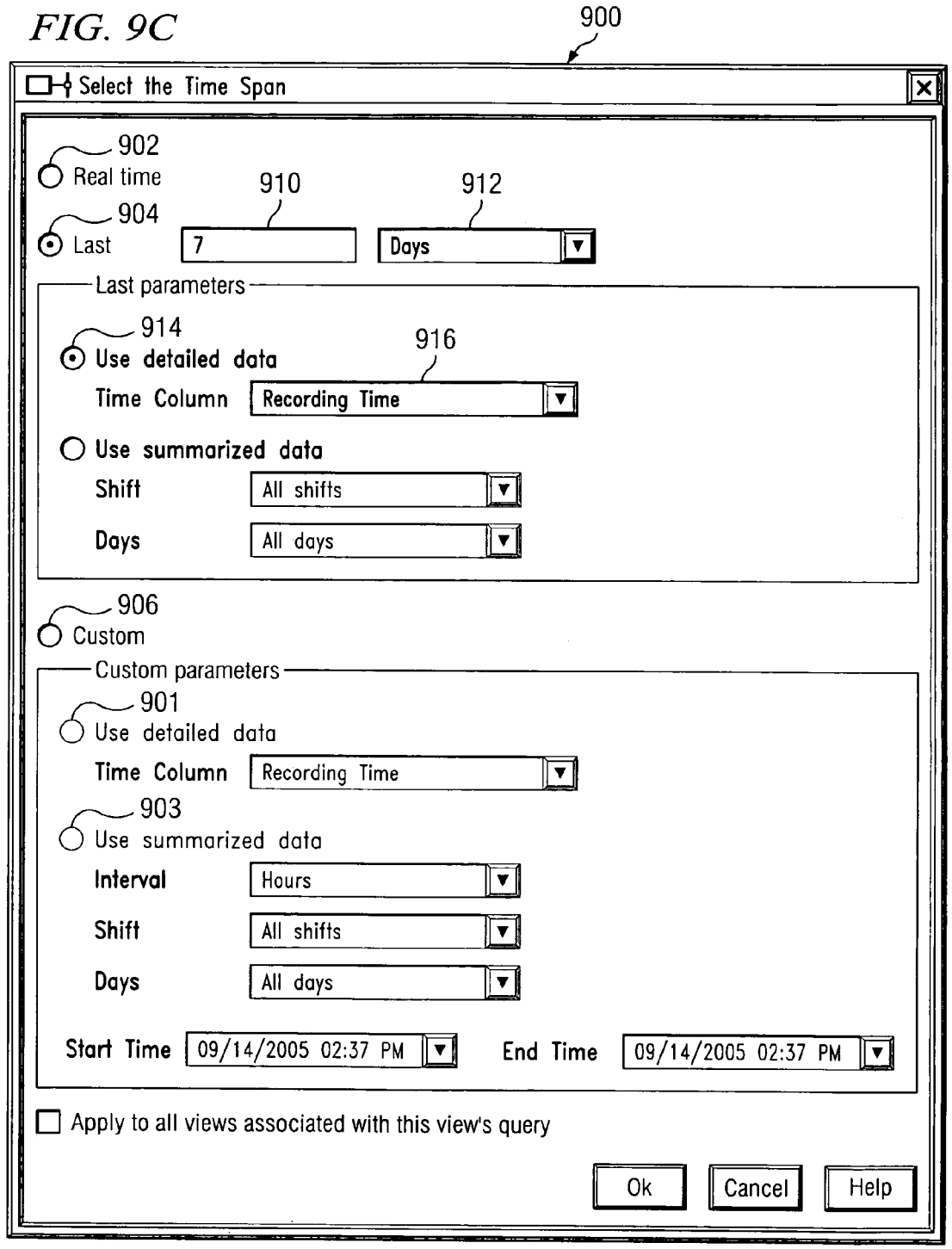
Figure 9D:
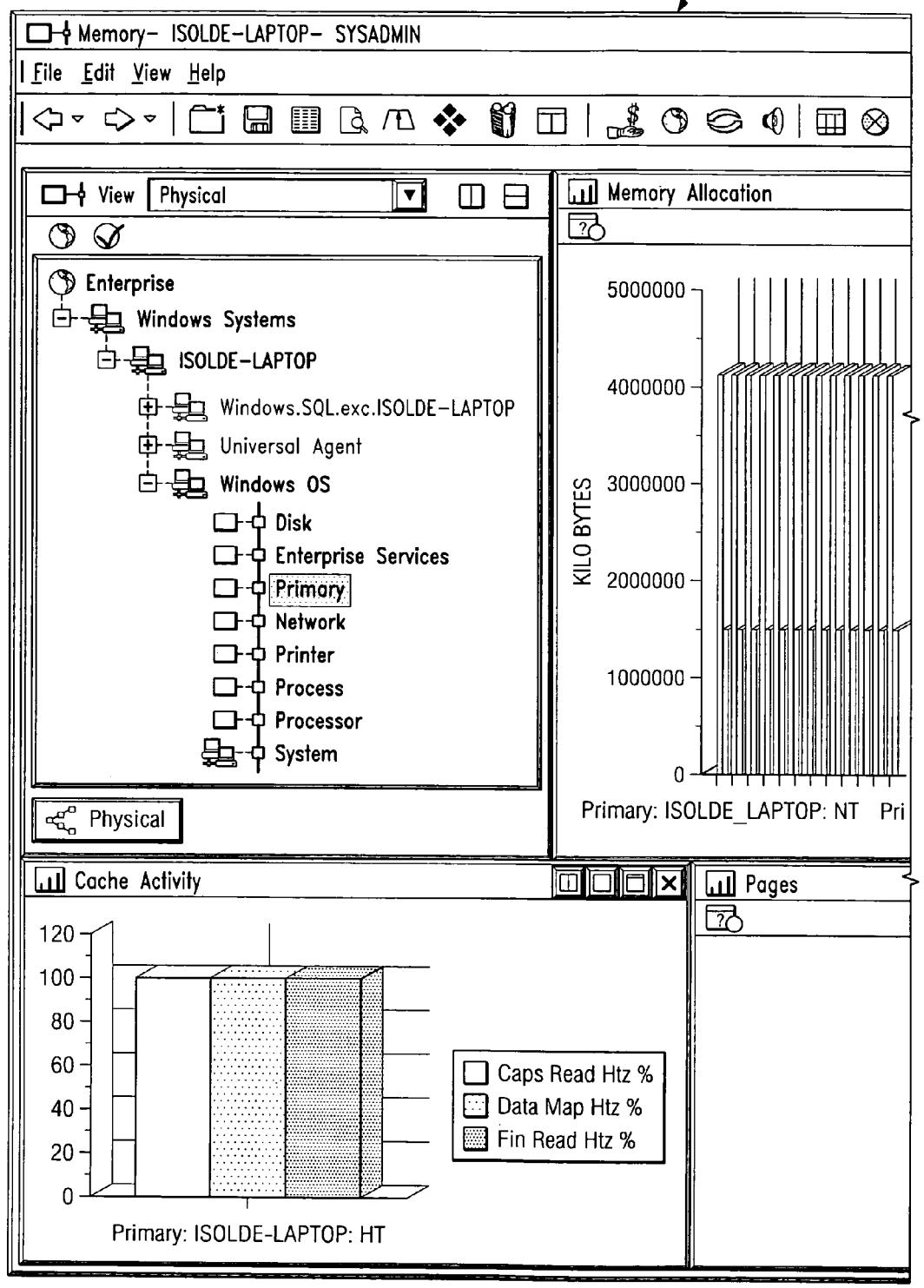

In FIG. 9C, last field 904 has been selected as the manner in which data in a data warehouse is to be presented. In this example, the data in the time period is for the last seven days as selected through fields 910 and 912. In this example, the user has selected to view detailed or real time data through the selection of field 914. The real time data is unsummarized or unaggregated data in these examples. With detailed data, the user may select the type of time column used in field 916. In this example, the recording time is employed. A timestamp when a packet was sent or received, or the timestamp when a reply was received, are 2 examples. Its other timestamp fields that may be kept as part of the data besides the recording time. The selection of this option results in the presentation of data in window 918 in FIG. 9D.

Figure 9E:
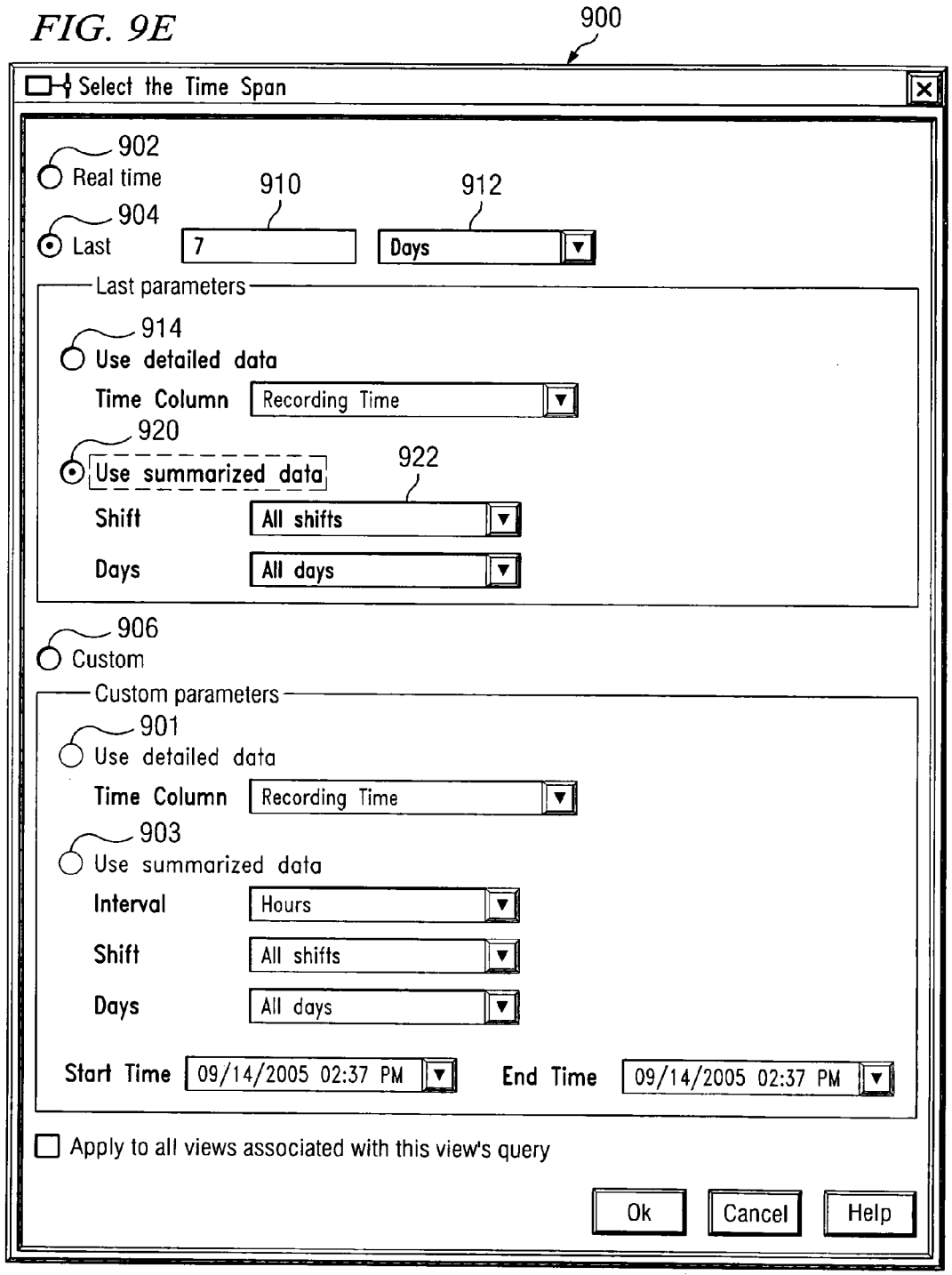
Figure 9F:
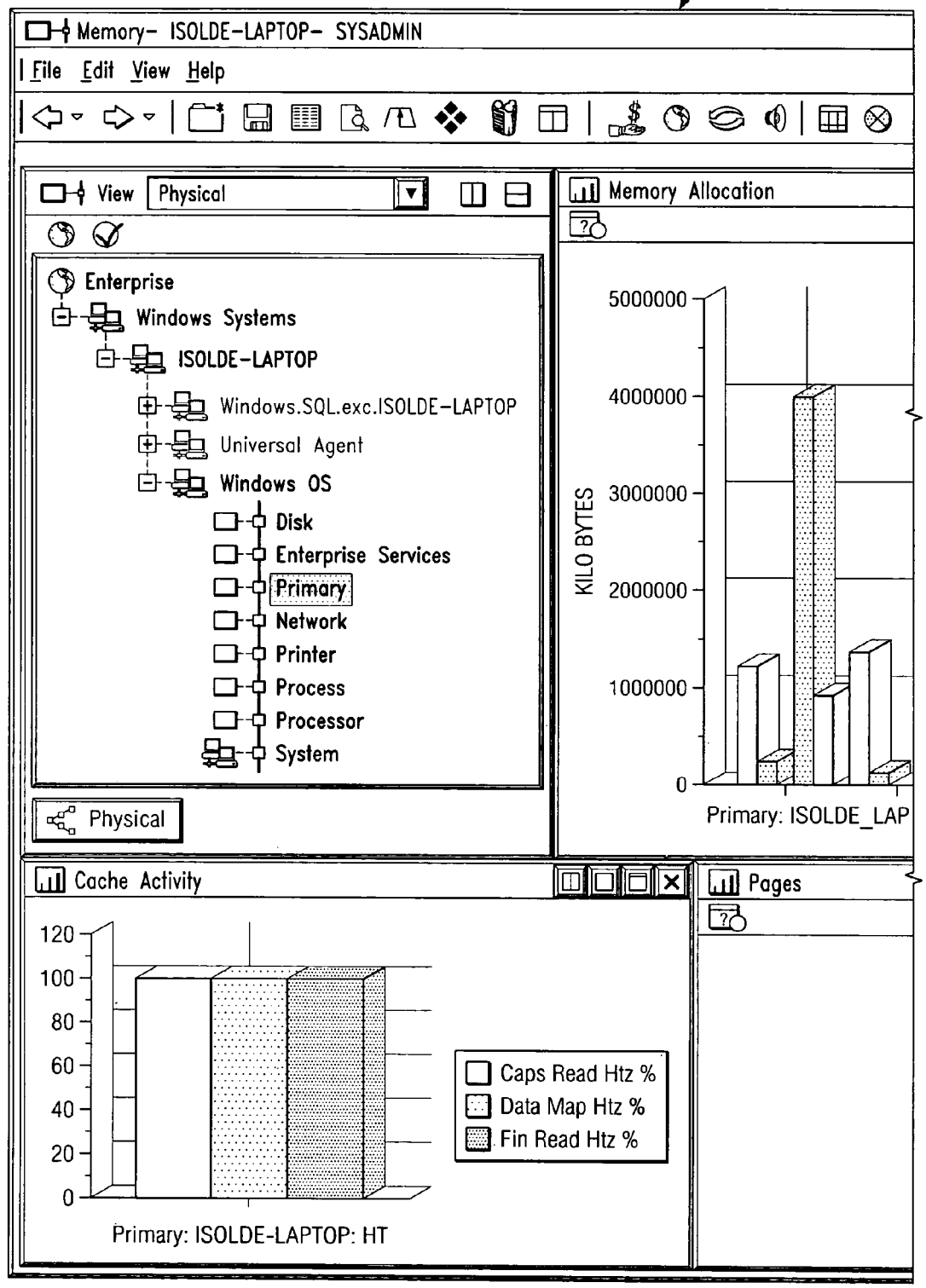

In FIG. 9E, the user has selected to view summarized or aggregated data through selecting field 916 in window 900. In this example, all days and shifts are selected for presentation through fields 920 and 922. This data is presented in window 924 in FIG. 9F. Of course, the user may select custom parameters through the selection of custom field 906. This type of selection allows the user to select particular intervals and days. For example, the user may select an interval in hours or days and the amount of data may be selected in terms of days with a start and end data of input by the user.

If the user selects to use summarized data in the query, the mapping is performed from the detailed table column to all defined summarized columns, and these columns will be returned for the query. For example, if there are MIN, MAX, and AVG % Processor Time values in the Hourly table, a query for the % Processor Time using the Hourly summarized data will return the AVG % Processor Time, MIN_% Processor Time, and MAX % Processor Time columns from the query. Post filtering can be used to limit the display of the data to the desired column. In the case where post filtering is broken by columns form the summarized tables being returned, the AGPRF ODI tag is substituted for the column name.

Figure 10:
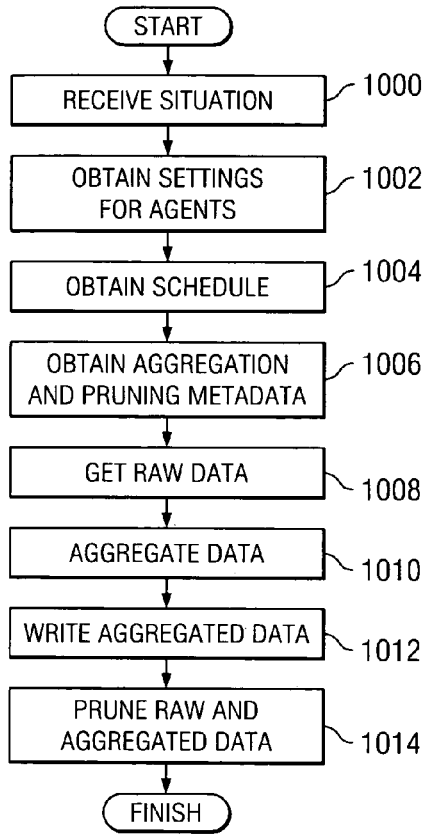
FIG. 10 is a high level flowchart of a process for aggregating and pruning data in accordance with an illustrative embodiment of the present invention.

Turning now to FIG. 10, a high level flowchart of a process for aggregating and pruning data is depicted in accordance with an illustrative embodiment of the present invention. The process illustrated in FIG. 10 may be implemented within processes for a central data warehouse, such as agents 316 in FIG. 3. In particular, these processes may be implemented within data aggregator 318 and data pruner 320 to manage data within data warehouse 300 in FIG. 3.

The process begins by receiving a situation (step 1000). A situation is a message indicating that the process for aggregating and pruning data should begin. In other words, a situation is an alert to begin the process. Thereafter, the process obtains settings for the agent (step 1002). These settings take the form meta data defining when and how pruning aggregation should occur. This meta data may be located within policies and meta data 314 and obtained through portal server 310 in FIG. 3 in these particular examples. In these examples, the situation is received from a management server, such as management server 308 in FIG. 3. The schedule obtained in step 1004 is obtained from a portal server, such as portal server 310 in FIG. 3. In particular, the schedule may be stored within policies and meta data 314 in FIG. 3.

Thereafter, the process obtains aggregation and pruning meta data (step 1006). This information also may be obtained from the portal server. This meta data includes, for example, attribute groups for which aggregation is to occur. The meta data returned for aggregation and pruning settings includes, in these examples, the aggregation time values (hourly, daily, weekly, monthly, quarterly, and yearly), as well as the pruning options. The options include, for example, how long (number and unit, for example—3 months) to keep data at each of the aggregated levels (hourly, daily, weekly, monthly, quarterly and yearly). The data for steps 1002 and 1006 is obtained via the same call, however this data is stored in a different location, so the backend process pulls together the data from several sources to return to the front end.

The raw data is then obtained (step 1008). The meta data obtained in step 1006 is used to collect the raw data within the data warehouse to be aggregated. Step 1008 may be implemented using a query to retrieve data from the data warehouse. The data may be sorted in different orders, such as order of object identity, timestamp, and warehouse key columns as specified in the meta data. A column of a table is a "warehouse key column" if it forms part of the data required for uniqueness of a row within the table. In these examples, the raw data is the data collected from intelligent remote agents that are stored in the data warehouse. The process then aggregates the raw data (step 1010). The aggregation performed is based on the aggregation meta data obtained by processing step 1006.

Thereafter, the process writes the aggregated data into the data warehouse (step 1012). The process then prunes raw aggregated data (step 1014) with the process terminating thereafter. The pruning occurs using the pruning meta data obtained in step 1006. In step 1010, the process obtains a record from the data retrieved. For each aggregated table, a working record is created. The process aggregates data based on the data from the current record source and the working record. In these illustrative examples, the computation or aggregation process is performed according to different aggregation types. The aggregation in step 1010 may be performed using the following rules:

MIN. If value of S is less than value of W, replace W with S. Otherwise, do nothing.

MAX. If value of S is larger than value of W, replace W with S. Otherwise, do nothing SUM. Add S and W and replace W.

EAR (earliest). If the source record is the $1^{st}$ record of the aggregated time period. Assign S to W.

LAT (latest). Replace W with S.

AVG. For each data filed with AVG enabled, two additional data fields will be added in the aggregated table (SUM and Count). Add S and W and replace the SUM. Also increment the Count.

In these rules, S represents the data field of the source record being processed and W represents the data field of the working record. Thereafter, the next record in a result set is retrieved, and the following rules are applied to this record:

If the timestamp of the next record exceeds the aggregation time boundary, calculate the AVG by dividing SUM by Count. Write the aggregated records out with To-Date column set to "N".

If the result set is empty, write all working records with To-Date column set to "Y". "Y" indicates that the record is not complete yet.

The aggregated tables are then updated. Each table has one or more records.

Figure 11A:
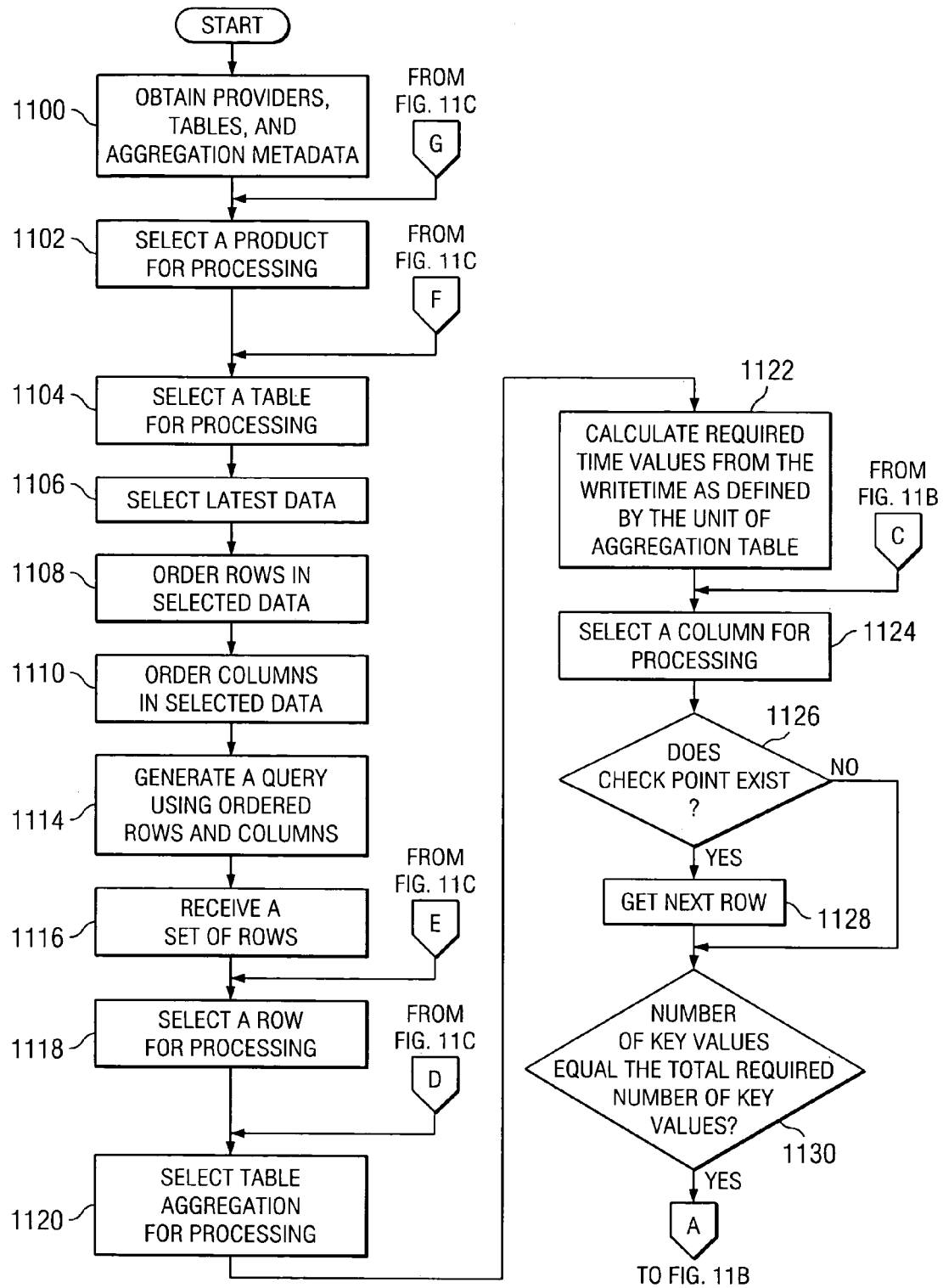

Turning now to FIGS. 11A-11C, a flowchart of a process for aggregating data is depicted in accordance with an illustrative embodiment of the present invention. The process illustrated in FIGS. 11A-11C may be implemented in an agent, such as data aggregator 318 in FIG. 3.

The process begins by obtaining providers, tables, and aggregation meta data (step 1100). A provider represents a unique product that collects data. For example, the Windows operating system agent and the Linux agent. Each provider (agent) can collect data for many tables. For example, the Windows operating system agent can collect data for these tables: memory, processor, network interface, and logical disk. For example, in the memory table, total physical and logical memory size, percentage of real memory used are recorded. In the processor table, percentage of processor utilization, number of processes and the amount of processor consumed by each process is recorded. The aggregation meta data contains the information used to aggregate or summarize the data for the data warehouse. Next, a product is selected for processing (step 1102). A product example is Windows Operating System Monitor. Another example is the DB2 Database monitor for Windows. The process then selects a table for processing (step 1104). Then, the latest data is selected (step 1106). In these examples, the latest data is the data that has not yet been processed within the data warehouse. The latest data may be identified through a marker that it used to indicate the data that has not yet been processed. Thereafter, the process orders rows in the selected data (step 1108) and orders columns in the selected data (step 1110). Steps 1108 and 1110 are steps used to generate a query to select a set of records. The query is generated using the ordered rows in columns (step 1114). These records are referred to as rows in these particular examples. The process receives a set of rows (step 1116). This set of rows is the set of records returned from the data warehouse in response to the query. A row is selected for processing (step 1118). This particular row is the first row in the order in response to the query returning the set of rows. The process selects an aggregation table for processing (step 1120). The aggregation table selected in step 1120 is the current aggregate table being processed. For example, if the memory table is being processed for hourly aggregate data, this table is the memory hourly aggregate table.

The process calculates required time values from the writetime as defined by the unit of aggregation table (step 1122). The write time represents the time of data collection. Based on the aggregation level, certain parts of the writetime need to be calculated. For example, if hourly aggregation is being performed then the year, month, day, hour values need to be calculated from the write time. Thereafter, the process selects a column for processing (step 1124). If the writetime and the origin node are known, a determination is made as to whether a check point exists (step 1126). If the check point exists, the next row in the set of the rows returned from the query is obtained (step 1138). Thereafter, a determination is made as to whether the number of key values equals the total required number of key values (step 1130). The process proceeds directly to this step from step 1126 if a check point does not exist. In step 1130, if the number of key values does not equal the number of required key values, then the next column is processed. This step is used to gather all the required columns required to make a row unique in terms of the aggregate processing.

The key value is compared with the previous row (step 1134). This step is used to determine whether the current row's data from the raw table should be aggregated into the same row in the aggregate table as the previous row's data from the raw table or not. As an example, for the memory table, if the key value is made up of hostname, writetime and these are four rows from the raw table in Table 1 below:

TABLE 1

| | hostname | writetime | available Kb |
|---|---|---|---|
| row1: | host1 | 2005-01-01 03:05:00 | 300 |
| row2: | host1 | 2005-01-01 03:10:00 | 350 |
| row3: | host1 | 2005-01-01 04:05:00 | 400 |
| row4: | host2 | 2005-01-01 04:10:00 | 330 |

During the processing for the aggregate at the hour level:
1) row1 is examined. Its key values are (hostname=host1, year=2005, month=1, day=1, hour=3). Its the first row, so a new aggregate row A will be used.
2) row2 is examined. Its key values are (hostname=host1, year=2005, month=1, day=1, hour=3). These match the key values of the previous row, so the aggregate row A will be based on row1 and row2.
3) row3 is examined. Its key values are (hostname=host1, year=2005, month=1, day=1, hour=4). These so not match the key values of the previous row, so a new aggregate row will be used (row B)
4) row4 is examined. Its key values are (hostname=host2, year=2005, month=1, day=1, hour=4). These so not match the key values of the previous row, so a new aggregate row will be used (row C)

A determination is made as to whether a new object is found (step 1134). The determination is made based on the key values. An aggregation object represents a row in an aggregation table. If a new aggregation object is found, the process creates a new output row in memory (step 1136). The process then creates aggregation values for the current column for the current object (step 1138). The aggregation values are created based on the aggregation behavior that has been declared for the column. For example, if this column behaves as a property, then the last value based on time is used. The current object is the representation in memory of the row in the aggregate table that is being currently processed.

A determination is then made as to whether additional unprocessed columns are present (step 1140). If additional unprocessed columns are present, the process returns to step 1124. With reference again to step 1134, if a new aggregation object is not found, the process proceeds directly to step 1140.

If more unprocessed columns are not present, the process adds an output row to the previous row (step 1142) and copies the current row to the previous row (step 1144). Thereafter, the current row is emptied (step 1146). The effect is to move the current and previous rows forward one row.

A determination is then made as to whether a check point boundary has been reached (step 1148). The checkpoint boundary is used to control which checkpoint is being currently processed. A check point boundary is used to control the correct insertion of data and to enable recovery. This check point is associated with different inserts on a per unit of time. If a check point boundary is reached, the process selects an output row (step 1152). A determination is made as to whether an aggregation object exists (step 1152). This determination in step 1152 is made by querying the table in the database that represents the rows for the aggregation object.

If an aggregation objects exists, the process combines the existing and new values to form a new row (step 1154). A determination is made as to whether additional rows are present for processing (step 1156). If additional rows are present, the process returns to step 1150. In step 1152, if an aggregation object does not exist, the process proceeds directly to step 1156 without combining values to form a new row. If additional rows are not present, inserts are made into the warehouse for current output rows (step 1158). The process proceeds directly to step 1158 from step 1148 if a check point boundary is not reached. The process writes a check point (step 1160). This check point is used to handle a failure that may occur part way through the aggregation of the table. When all of the data for a given unit of time and the origin node are processed, a check point row is written into the database. At the end of a successful processing of these tables, the check points are deleted.

A determination is made as to whether additional aggregation tables are present for processing (step 1162). If additional aggregation tables are present, the process returns to step 1120 to select another aggregation table for processing. Otherwise, a determination is made as to whether additional rows are present for processing (step 1164). If additional rows are present, the process returns to step 1118 to select another row for processing.

If additional rows are not present for processing, a table aggregation is selected from the aggregation table (step 1166). This second loop loops around the different aggregations defined for the table. For example, hourly, daily and so on. The process selects an output row (step 1168). A determination is made as to whether or not an aggregation object exists (step 1170). This determination is used to determine whether a new row is created or an existing row is updated. If the aggregation object exists, the process combines existing and new values to form a new output row (step 1172). The existing values in step 1172 come from the aggregate tables in the database. The new values come from the raw table. Thereafter, a determination is made as to whether additional output rows are present (step 1174). The process proceeds directly to this step from step 1170 if additional aggregation objects do not exist.

If additional output records are present, the process returns to step 1168 to select another row for processing. Otherwise, inserts are made into the warehouse for the current output rows (step 1176). Thereafter, the process inserts the current output rows (step 1178). The process then deletes the check points (step 1180).

These check points are deleted because the processing of the table aggregation has completed successfully. A determination is made as to whether additional table aggregations are present (step 1182). If additional table aggregations are present for processing, the process returns to step 1166. Otherwise, a marker is written to record the end of the current selected data from the table (step 1184). The marker represents a start and end point of a given aggregation run. The value of a marker is a combination of the writetime and origin node. A determination is made as to whether additional tables are present for processing (step 1186). If additional tables are present, the process returns to step 1104 as described above. Otherwise, a determination is made as to whether additional products are present for processing (step 1188). If additional products are present, the process returns to step 1102, otherwise the process terminates.

With reference now to FIG. 12, a flowchart of a process for pruning data in a date warehouse is depicted in accordance with an illustrative embodiment of the present invention. The process illustrated in FIG. 12 may be implemented in an agent, such as data pruner 320 in FIG. 3. This pruning process is illustrated as being used in a data warehouse, but also may be applied to any data storage system. For example, the pruning process may be applied to a database or other type data store.

The process begins by obtaining products, tables, and pruning meta data (step 1200). The process then selects a product for processing (step 1202), and the process selects a table for processing (step 1204). The initial start write time and initial end write time for data to be pruned is identified (step 1206). In resetting the end write time, these are the first pair of timestamps used in a prune attempt. A select count is performed to identify rows that qualify for pruning (step 1208). A count is made of the number of rows that qualify based on the start and end timestamps. If this exceeds the maximum allowed, then the start and end timestamps are adjusted so that fewer rows qualify. Next, a determination is made as to whether the number of rows exceeds the maximum number of rows that can be deleted in a single transaction (step 1210). If the number of rows identified exceeds the number of rows that can be deleted in a single transaction, the end write time is reset (step 1224). A count is made of the number of rows that qualify based on the start and end timestamps. If this count exceeds the maximum allowed, then the start and end timestamps are adjusted so that fewer rows qualify, with the process then returning to step 1208. Otherwise, a determination is made as to whether the count of the number of rows for pruning is greater than zero (step 1212). If the number of rows is greater than zero, then the process deletes rows in the table selected for processing based on the range start write time to the end write time (step 1214). A count is made of the number of rows that qualify based on the start and end timestamps. If this exceeds the maximum allowed, then the start and end timestamps are adjusted so that fewer rows qualify.

Next, the start write time is set to the end write time and the end write time is set to the initial end write time (step 1216). Data is aggregated based on a number of values for each row. For example, data for memory-related data is aggregated at the hourly level based on a unique set of values for (year, month, day, hour, hostname) for each row of raw data. More complex examples occur for databases, where the aggregation at the hourly level for database-related raw data is based on a unique set of values for (year, month, day, hour, hostname, instance, database). The process then returns to step 1208.

With reference again to step 1212, if the count of the number of rows is not greater than zero, a determination is made as to whether the count is equal to zero (step 1218). If the count is not equal to zero, the process returns to step 1208. Otherwise, a determination is made as to whether additional tables are present for processing (step 1220). If additional tables are present for processing, the process returns to step 1204. Otherwise, a determination is made as to whether additional products are present for processing (step 1222). If additional products are present, the process returns to step 1202. Otherwise, the process terminates.

Figure 13:
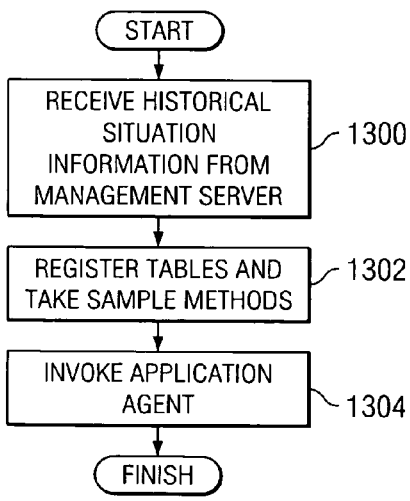
FIG. 13 is a flowchart of a process used by a generic agent in accordance with an illustrative embodiment of the present invention.

Turning next to FIG. 13, a flowchart of a process used by a generic agent is depicted in accordance with an illustrative embodiment of the present invention. The process illustrated in FIG. 13 may be implemented in an intelligent remote agent, such as one in intelligent remote agents 302 in FIG. 3. In particular, this process may be implemented in the generic portion of such an agent, such as generic ETL agent 402 in FIG. 4.

The process begins by receiving historical situation information from a management server (step 1300). The historical situation is a warehouse mechanism with which the warehouse data collections can be configured through a management platform. The process then registers tables and takes sample methods (step 1302). The process invokes the application agent (step 1304) with the process terminating thereafter.

Figure 14:
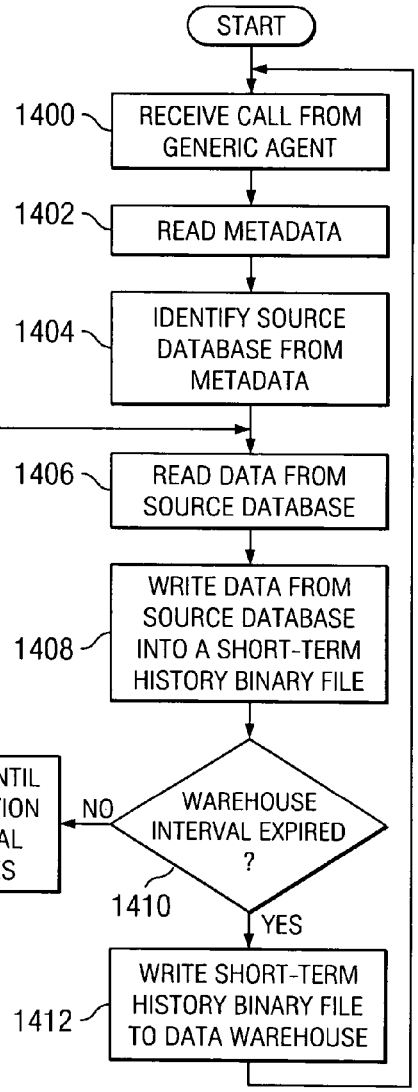
FIG. 14 is a flowchart of a process for an application agent in accordance with an illustrative embodiment of the present invention.

With reference to FIG. 14, a flowchart of a process for an application agent is depicted in accordance with an illustrative embodiment of the present invention. The process illustrated in FIG. 14 may be implemented in an intelligent remote agent such as one found in intelligent remote agents 302 in FIG. 3. In particular, this process may be implemented within application ETL agent 404 in FIG. 4.

The process begins by receiving a call from the generic agent (step 1400). Meta data is then read (step 1402). The process then identifies the source database from the meta data (step 1404). The process reads data from the source database (step 1406). The process then writes the data from the source database into a short-term history binary file (step 1408). In this example, step 1408 branches to step 1414 and 1410. Steps 1410 and 1412 occur asynchronously through a warehouse interval timer. More specifically, the writing of the short-term history file to data warehouse happens every nth time the collection interval expires, based on the collection interval and the warehouse interval. For example, if collection interval is 15 minutes and the warehouse interval is 60 minutes, the warehouse export happens every fourth collection, and occurs as soon as the collection has finished.

Asynchronously, a determination is made as to whether a warehouse interval has expired (step 1410). The warehouse interval is used to determine when data is to be transferred to a data warehouse. If the warehouse interval has expired, the short-term history binary file is written or sent to the data warehouse (step 1412). At this point, the process returns to step 1400 and waits for the generic agent to invoke the application agent again.

With reference again to step 1410, if the warehouse interval has not expired, the process sleeps until the collection interval expires (step 1414). The collection interval is the interval time after which collection of data occurs. When the collection interval expires, the process returns to step 1406 to read data from a source database.

Thus, the aspects of the present invention provide an improved computer implemented method, apparatus, and computer usable program code for managing data in a data storage system. In these particular examples, the data storage system takes the form of a data warehouse. The aspects of the present invention may be applied to other types of data storage systems other than just a data warehouse in which the management of data is of interest. The aspects of the present invention provide a mechanism for aggregating data within a data warehouse. This aggregation of data involves summarizing data over a period of time or some other grouping.

The aspects of the present invention also provide an ability to manage the size of this data through pruning processes. The aspects of the present invention prune or delete data after certain periods of time. The pruning of data occurs through user configurable intervals. As a result, both the raw data and the aggregated data may be removed from the data warehouse after some period of time to reduce the amount of storage consumed by the data. This removal of data may involve merely deleting the data. In other aspects of the present invention, the deletion of data involves storing the data in some archival storage, such as tape or optical disk. Additionally, the aspects of the present invention provide a process used to gather data from different data sources. In the illustrative examples, the data is gathered through an agent that is configured to monitor and collect data from a data source. The collection of this data is periodically sent back to the data warehouse for processing.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for collecting data, the computer implemented method comprising:

collecting data from a particular data source by an application portion of agent to form collected data, wherein the application portion is associated with the particular data source in response to an event;

storing, by the application portion of the agent, the collected data in a data file within a data store device for transfer to a data storage system to form stored data in the data store device;

sending the stored data to the data storage system using a generic portion of the agent, wherein the generic portion of the agent is configured to send data to the data storage system, wherein both the application portion of the agent and the generic portion of the agent directly access the data store device by calling a respective application programming interface (API), and wherein the event is an invocation of the application portion of the agent by the generic portion of the agent that occurs responsive to information received by the generic portion of the agent that specifies the particular data source as well as an expected format of the data to collect from the particular data source; and selectively transforming the collected data into a format for aggregation with other data in the data storage system using an aggregation policy that specifies attributes for aggregating the collected data and the other data into different time-based granularities, wherein the generic portion of the agent comprises (i) a generic application programming interface that the application portion of the agent calls using an application programming interface portion of the application agent in order to store the collected data in the data file, and (ii) an intelligent remote agent application programming interface that is called by generic agent code of the generic portion of the agent to both retrieve the stored data from the data file and send the stored data to the data storage system.

2. The computer implemented method of claim 1 wherein the collected data in the data file is sent to the data storage system upon expiration of a timer.

3. The computer implemented method of claim 1 further comprising receiving the stored data by the data storage system to form received data, and pruning the received data by a pruning agent based on a pruning policy that defines when certain warehoused data in the data storage system is to be deleted from the data storage system, wherein the event is a periodic event.

4. The computer implemented method of claim 1, wherein the collecting step comprises:
   establishing a connection to the data source; and
   sending requests to the data source for the data.

5. A data processing system comprising a processor coupled to a memory having instructions stored therein that are operable, when executed by the process, to perform a method comprising:
   collecting data from a particular data source by an application portion of agent to form collected data, wherein the application portion is associated with the particular data source in response to an event;
   storing, by the application portion of the agent, the collected data in a data file within a data store device for transfer to a data storage system to form stored data in the data store device; and
   sending the stored data to the data storage system using a generic portion of the agent, wherein the generic portion of the agent is configured to send data to the data storage system, wherein both the application portion of the agent and the generic portion of the agent directly access the data store device by calling a respective application programming interface (API), and wherein the event is an invocation of the application portion of the agent by the generic portion of the agent that occurs responsive to information received by the generic portion of the agent that specifies the particular data source as well as an expected format of the data to collect from the particular data source, wherein the generic portion of the agent comprises (i) a generic application programming interface that the application portion of the agent calls using an application programming interface portion of the application agent in order to store the collected data in the data file, and (ii) an intelligent remote agent application programming interface that is called by generic agent code of the generic portion of the agent to both retrieve the stored data from the data file and send the stored data to the data storage system, wherein the data is collected according to a collection window and the stored data is sent to the data storage system according to a warehouse window that expires every nth time the collection window expires.

6. An agent stored in a non-transitory computer readable medium of a data processing system and operable by a data processor of the data processing system for collecting data when executed by the data processor, the agent perform the operation of:
   collecting data from a particular data source by an application portion of agent to form collected data, wherein the application portion is associated with the particular data source in response to an event;
   storing, by the application portion of the agent, the collected data in a data file within a data store device for transfer to a data storage system to form stored data in the data store device;
   sending the stored data to the data storage system using a generic portion of the agent, wherein the generic portion of the agent is configured to send data to the data storage system, wherein both the application portion of the agent and the generic portion of the agent directly access the data store device by calling a respective application programming interface (API), and wherein the event is an invocation of the application portion of the agent by the generic portion of the agent that occurs responsive to information received by the generic portion of the agent that specifies the particular data source as well as an expected format of the data to collect from the particular data source; and
   selectively transforming the collected data into a format for aggregation with other data in the data storage system using an aggregation policy that specifies attributes for aggregating the collected data and the other data into different time-based granularities, wherein the generic portion of the agent comprises (i) a generic application programming interface that the application portion of the agent calls using an application programming interface portion of the application agent in order to store the collected data in the data file, and (ii) an intelligent remote agent application programming interface that is called by generic agent code of the generic portion of the agent to both retrieve the stored data from the data file and send the stored data to the data storage system.

7. The agent of claim 6, wherein the generic agent code calls the intelligent remote agent application programming interface to register the table.

* * * * *